(12) United States Patent
Kuromizu

(10) Patent No.: US 8,896,767 B2
(45) Date of Patent: Nov. 25, 2014

(54) ILLUMINATION DEVICE, DISPLAY DEVICE, TELEVISION RECEIVING DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/238,074

(22) PCT Filed: Aug. 3, 2012

(86) PCT No.: PCT/JP2012/069812
§ 371 (c)(1),
(2), (4) Date: Feb. 10, 2014

(87) PCT Pub. No.: WO2013/024713
PCT Pub. Date: Feb. 21, 2013

(65) Prior Publication Data
US 2014/0218625 A1 Aug. 7, 2014

(30) Foreign Application Priority Data

Aug. 12, 2011 (JP) .................................. 2011-177170

(51) Int. Cl.
*H04N 3/14* (2006.01)
*F21K 99/00* (2010.01)
*H04N 5/66* (2006.01)
*G02F 1/1335* (2006.01)
*H04N 5/74* (2006.01)

(52) U.S. Cl.
CPC .. *F21K 9/50* (2013.01); *H04N 5/66* (2013.01); *G02F 1/133603* (2013.01); *G02F 1/133605* (2013.01); *H04N 5/7408* (2013.01)
USPC ....................................... 348/790

(58) Field of Classification Search
USPC ......... 348/790, 791–794, 801–803, 744, 725; 349/61–68
See application file for complete search history.

(56) References Cited

U.S. PATENT DOCUMENTS

| | | | | |
|---|---|---|---|---|
| 2011/0242742 A1* | 10/2011 | Kim et al. | ................ | 361/679.01 |
| 2011/0310078 A1* | 12/2011 | Yamazaki et al. | ............ | 345/211 |
| 2011/0317080 A1* | 12/2011 | Takata | .......................... | 348/739 |
| 2012/0057095 A1* | 3/2012 | Kuromizu | ....................... | 349/61 |
| 2012/0236204 A1* | 9/2012 | Kasai | ............................ | 348/553 |
| 2012/0320270 A1* | 12/2012 | Takata | ......................... | 348/554 |
| 2013/0188100 A1* | 7/2013 | Ikuta | ............................ | 348/739 |

FOREIGN PATENT DOCUMENTS

JP        2011-3549 A        1/2011

* cited by examiner

*Primary Examiner* — Paulos M Natnael
(74) *Attorney, Agent, or Firm* — Chen Yoshimura LLP

(57) ABSTRACT

The backlight device (12) of the present invention is provided with: an LED (24); an LED substrate (25) on which the LED (24) is mounted; a reflective sheet (29) that reflects light from the LED (24), has a lens insertion hole (29d) into which the LED (24) is inserted, and is arranged so as to cover the mounting surface (25a1) of the LED (24) on the LED substrate (25); a first light-reflecting layer (30) that is formed in at least the portion of the mounting surface (25a1) of the LED substrate (25) that is inside the lens insertion hole (29d), and that reflects light from the LED (24); and a second light-reflecting layer (31) that is arranged in at least the portion of the mounting surface (25a1) of the LED substrate (25) that is inside the lens insertion hole (29d), has a light reflectance different from that of the first light-reflecting layer (30), and is formed to have a shape partially covering the first light-reflecting layer (30).

13 Claims, 21 Drawing Sheets

US 8,896,767 B2

ILLUMINATION DEVICE, DISPLAY DEVICE, TELEVISION RECEIVING DEVICE

TECHNICAL FIELD

The present invention relates to an illumination device, a display device, and a television receiver.

BACKGROUND ART

A liquid crystal panel used in a liquid crystal display device such as a liquid crystal television, for example, does not emit light, and thus, it is necessary to provide a separate backlight device as an illumination device. This backlight device is provided on the rear side of the liquid crystal panel (a side opposite to the display surface), and includes a chassis that is open towards the liquid crystal panel, a light source housed in the chassis, and optical members (diffusion sheet and the like) that are disposed facing the light source and covering the open side of the chassis, the optical members being provided to efficiently emit light from the light source toward the liquid crystal panel. LEDs are sometimes used as the light source among the constituent members of the above-mentioned backlight device, for example, and in such a case, an LED substrate having the LEDs mounted thereon is stored in the chassis.

The disclosure of Patent Document 1 below is one example of the backlight device that uses LEDs as the light source.

RELATED ART DOCUMENT

Patent Document

Patent Document 1: Japanese Patent Application Laid-Open Publication No. 2011-3549

Problems to be Solved by the Invention

On the LED mounting surface of the LED substrate, wiring patterns for supplying power to the LEDs are formed, and in addition, a solder resist is coated thereon in order to prevent oxidation of the wiring patterns, prevent shorting among the wiring patterns, or the like. If the solder resist has a white surface, then it is possible to efficiently reflect light from the LEDs by the mounting surface of the LED substrate. The light reflectance of the solder resist can vary depending on the thickness thereof, and it has become difficult to provide an even thickness due to manufacturing constraints. As a result, the amount of light reflected by the solder resist has become subject to variation, and as a result, there was a risk of uneven brightness.

SUMMARY OF THE INVENTION

The present invention was completed in view of the above-mentioned situation, and an object thereof is to mitigate uneven brightness.

Means for Solving the Problems

An illumination device of the present invention includes: a light source; a light source substrate on which the light source is mounted; a reflective member that reflects light from the light source, and that has a light source insertion hole for inserting the light source, the reflective member covering a mounting surface for the light source on the light source substrate; a first light-reflecting layer that reflects light from the light source, the first light-reflecting layer being formed at least in the light source insertion hole on the light source substrate; and a second light-reflecting layer disposed in the light source insertion hole on the light source substrate, the second light-reflecting layer having a light reflectance different from that of the first light-reflecting layer and being disposed so as to cover a portion of the first light-reflecting layer.

The light emitted by the light source is reflected by the reflective member or reflected by the first light-reflecting layer formed in portions of the mounting surface of the light source substrate for the light source corresponding to where the light source insertion holes are formed, or by the second light-reflecting layer formed so as to cover portions of the first light-reflecting layer, and thus, light outputted by the illumination device can be used effectively. In the first light-reflecting layer, the light reflectance can vary depending on the thickness thereof, and there is a possibility of the thickness varying due to manufacturing reasons. As a countermeasure, the second light-reflecting layer has a different light reflectance than the first light-reflecting layer and is formed on portions of the first light-reflecting layer, and by appropriately setting where the second light-reflecting layer is formed (where the first light-reflecting layer is not covered by the second light-reflecting layer) and the light reflectance of the second light-reflecting layer, it is possible to stabilize the light reflectance of the mounting surface of the LED substrate even if there is some variation in the thickness of the light-reflecting layer and the light reflectance thereof. As a result, the amount of light reflected by the mounting surface of the light source substrate is stabilized, and thus, uneven brightness in the light outputted by the illumination device is mitigated.

As embodiments of the present invention, the following configurations are preferred.

(1) The second light-reflecting layer has a light reflectance lower than that of the first light-reflecting layer. If increasing the thickness of the first light-reflecting layer to a certain amount results in decreased variation in the light reflectance of the first light-reflecting layer, then it is preferable that the thickness of the first light-reflecting layer be set to such thickness and that variation in light reflectance in the first light-reflecting layer be minimized. At this time, the first light-reflecting layer has a risk of having an excessively high light reflectance due to being formed at a certain thickness, but according to the present invention, the second light-reflecting layer with a lower light reflectance than the first light-reflecting layer covers portions of the first light-reflecting layer, and thus, by appropriately setting where the second light-reflecting layer is formed and the light reflectance thereof, it is lower the light reflectance of the mounting surface of the light source substrate, which would otherwise have a tendency to be too high. As a result, it is possible to suitably mitigate uneven brightness.

(2) The second light-reflecting layer is formed such that a proportion of area per unit area taken up by the second light-reflecting layer on the mounting surface of the light source substrate is smaller, the further away the second light-reflecting layer is from the light source. In this manner, a greater proportion of the area of the first light-reflecting layer, which has a higher light reflectance than the second light-reflecting layer, is not covered by the second light-reflecting layer in portions of the first light-reflecting layer further from the light source, and thus, the light reflectance of the mounting surface of the light source substrate becomes higher the further away from the light source that it is. In positions on the mounting surface of the light source substrate that are relatively close to the light source, the amount of light is large, but according to the above-mentioned configuration, the light reflectance is made low, which decreases the amount of light reflected in this area, which would otherwise have a tendency to exhibit excessive light reflection. On the other hand, in positions on the mounting surface of the light source substrate that are relatively far from the light source, the amount of light is less, and thus, the amount of light reflectance can be made high by the above-mentioned configuration, in this area where the amount of light would otherwise tend to be insufficient. As a result, the amount of light reflected by the mounting surface of the light source substrate is evened out, and it is possible to appropriately mitigate uneven brightness to a greater degree. Furthermore, compared to a case in which the thickness and material of the second light-reflecting layer was changed based on the distance thereof from the light source, it is possible to form the second light-reflecting layer with ease, thus decreasing the manufacturing cost.

(3) The second light-reflecting layer includes a plurality of dots distributed on the mounting surface of the light source substrate, the dots having a smaller diameter, the further away from the light source the dots are. In this manner, the second light-reflecting layer includes a plurality of dots and the diameter of the dots is varied depending on the distance thereof from the light source, and thus, it is possible to have a smooth variance of light reflectance in the mounting surface of the light source substrate, which allows the amount of light reflected by the light source substrate to be more even.

(4) The second light-reflecting layer includes a plurality of dots distributed on the mounting surface of the light source substrate, a gap between adjacent dots being greater, the further away from the light source the dots are. In this manner, the second light-reflecting layer includes a plurality of dots and the gap between the dots is varied depending on the distance thereof from the light source, and thus, it is possible to have a smooth variance of light reflectance in the mounting surface of the light source substrate, which allows the amount of light reflected by the light source substrate to be more even.

(5) The light source is a point light source that is a point on the mounting surface of the light source substrate, and the second light-reflecting layer surrounds the point light source in a plan view. In this manner, light emitted by the point light source tends to spread in the radial direction in a plan view with the point light source as a center, and by having the light reflected by the second light-reflecting layer formed so as to surround the point light source and by portions of the first light-reflecting layer not covered by the second light-reflecting layer, it is possible to mitigate a specific directivity in the circumferential direction from forming in the reflected light. As a result, unevenness in the light reflected by the mounting surface of the light source substrate can be further mitigated.

(6) The second light-reflecting layer includes a plurality of dots distributed in the light source insertion hole on the mounting surface of the light source substrate so as to surround the point light source on a circle with a center corresponding in position to the point light source, the dots adjacent in a circumferential direction having a substantially equal area and gaps therebetween. In this manner, light spreading in the radial direction from the point light source is reflected by the second light reflecting layer including dots that are substantially equal in area and gap in the circumferential direction, and by portions of the first light-reflecting layer not covered by the second light-reflecting layer, and thus, it is possible to mitigate a specific directivity in the circumferential direction from forming in the reflected light. In this manner, unevenness in the light reflected by the mounting surface of the LED substrate can be further mitigated.

(7) The light source substrate includes an optical lens that is disposed facing the light source and that emits light entering from the light source while applying an optical effect on the light, the insertion hole in the reflective member being large enough to insert both the light source and the optical lens, and the second light-reflecting layer is formed at least in an area corresponding in position to the optical lens in a plan view. In this manner, light emitted by the light source enters the optical lens and is outputted therefrom after having prescribed optical effects applied thereon. Not all of the light from the light source is necessarily outputted as is after being inputted to the optical lens, and some of the light is reflected by the optical lens back towards the light source substrate. Such light reflected by the optical lens is reflected back by the first light-reflecting layer and second light reflecting layer formed on the mounting surface of the light-source substrate, and thus reenters the optical lens. Therefore, the amount of light reflected off of the mounting surface of the light source substrate by the second light-reflecting layer is stabilized, and thus, the amount of light entering the optical lens is also stabilized, thus making this configuration more suitable to mitigating uneven brightness.

(8) The second light-reflecting layer is formed over a wider area than the optical lens in a plan view. In this manner, even if there are cases in which the light reflected by the optical lens is radiated onto the mounting surface of the light source substrate across an area wider than the optical lens in a plan view, the reflected light is reflected back by the second light-reflecting layer towards the optical lens, which allows the amount of light entering the optical lens to be stabilized.

(9) The second light-reflecting layer is formed such that a light reflectance of the mounting surface of the light source substrate is greater in portions of the mounting surface further from the light source. In positions on the mounting surface of the light source substrate that are relatively close to the light source, the amount of light is large, but according to the above-mentioned configuration, the light reflectance is made low, which decreases the amount of light reflected in this area, which would otherwise have a tendency to exhibit excessive light reflection. On the other hand, in positions on the mounting surface of the light source substrate that are relatively far from the light source, the amount of light is less, and thus, the amount of light reflectance can be made high, in this area where the amount of light would otherwise tend to be insufficient. In this manner, the amount of light reflected by the mounting surface of the light source substrate is evened out, thus allowing uneven brightness to be further mitigated in an excellent manner.

(10) The second light-reflecting layer includes a plurality of dots dispersed within an area of the mounting surface of the light source substrate. In this manner, the second light-reflecting layer includes a plurality of dots, which allows minute adjustments to be made on the range where the second light-reflecting layer is formed (range where the first light-reflecting layer is not covered by the second light-reflecting layer) by the form of the dot pattern (number, area, etc.), allowing a configuration more useful to evening out the brightness.

(11) The mounting surface of the light source substrate has formed thereon a wiring line member connected to the light source, and the first light-reflecting layer is made of a solder resist that covers the wiring line member. In this manner, it is possible to protect the wiring line member and the like by the solder resist. The first light-reflecting layer is made of the solder resist, and thus, it is possible to have a simpler structure at a less expensive manufacturing cost compared to a case in which the first light-reflecting layer were made separately from the solder resist.

(12) The solder resist from which the first light-reflecting layer is made is coated as a liquid onto the mounting surface of the light source substrate and then cured. While thickness of the solder resist formed by curing the liquid has a tendency to be difficult to control due to manufacturing reasons, it is possible to stabilize the light reflectance of the mounting surface of the light source substrate by the second light-reflecting layer, thus mitigating uneven brightness.

Next, in order to achieve the above-mentioned object, a display device of the present invention includes the above-mentioned illumination device and a display panel that performs display by using light from the illumination device.

With such a display device, the illumination device that supplies light to the display panel is not susceptible to uneven brightness, and therefore, it is possible to realize display with excellent display quality.

Examples of the display panel include a liquid crystal panel. As a liquid crystal display device, such a display device can be applied to various applications such as a television or the display of a personal computer, for example, and is particularly suitable for large screens.

Effects of the Invention

According to the present invention, it is possible to mitigate uneven brightness.

DETAILED DESCRIPTION OF EMBODIMENTS

Embodiment 1

Embodiment 1 of the present invention will be described with reference to FIGS. 1 to 13. In the present embodiment, a liquid crystal display device 10 will be described as an example. The drawings indicate an X axis, a Y axis, and a Z axis in a portion of the drawings, and each of the axes indicates the same direction for the respective drawings. The top side of FIGS. 7 and 8 is the front side, and the bottom side of FIGS. 7 and 8 is the rear side.

(Television Receiver)

Figure 1:
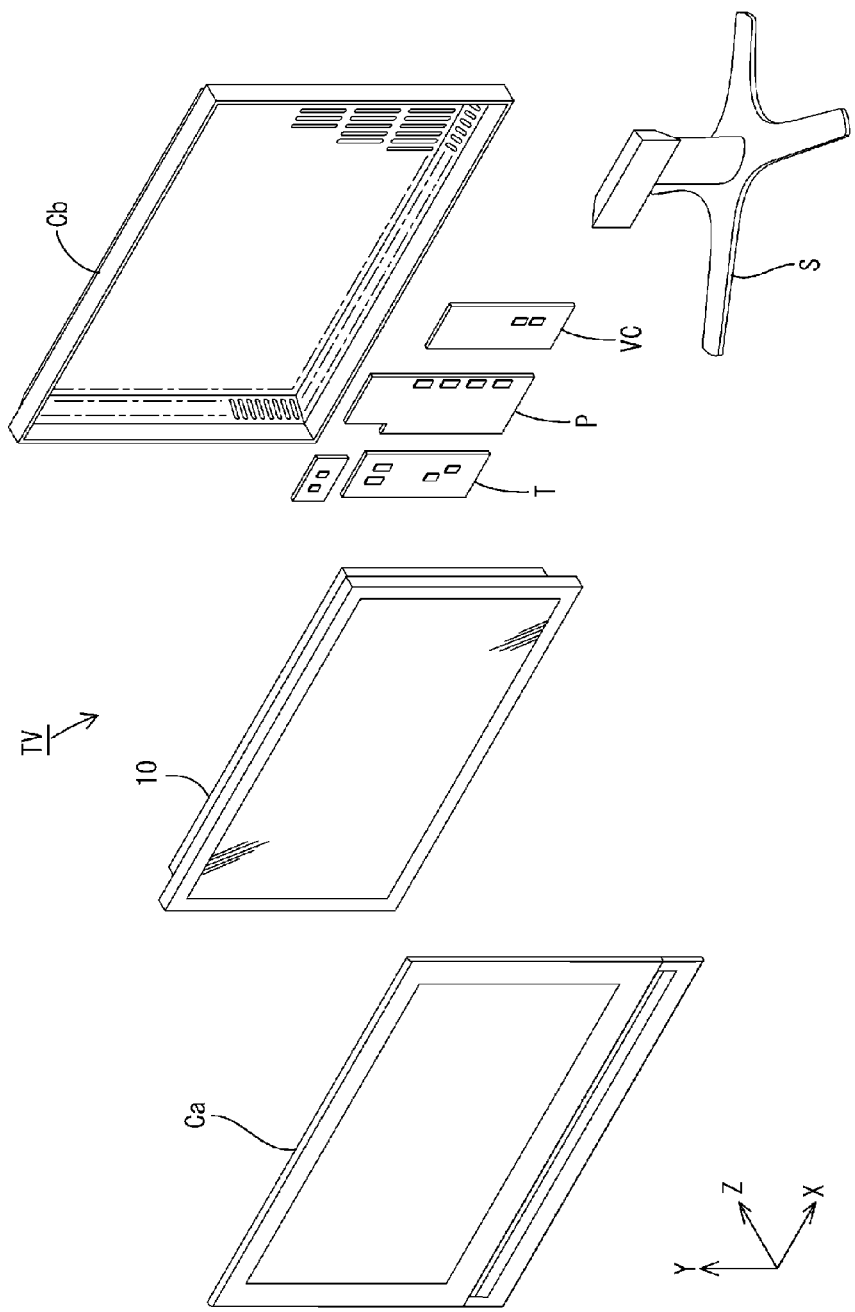
FIG. 1 is an exploded perspective view that shows a schematic configuration of a television receiver according to Embodiment 1 of the present invention.
Figure 2:
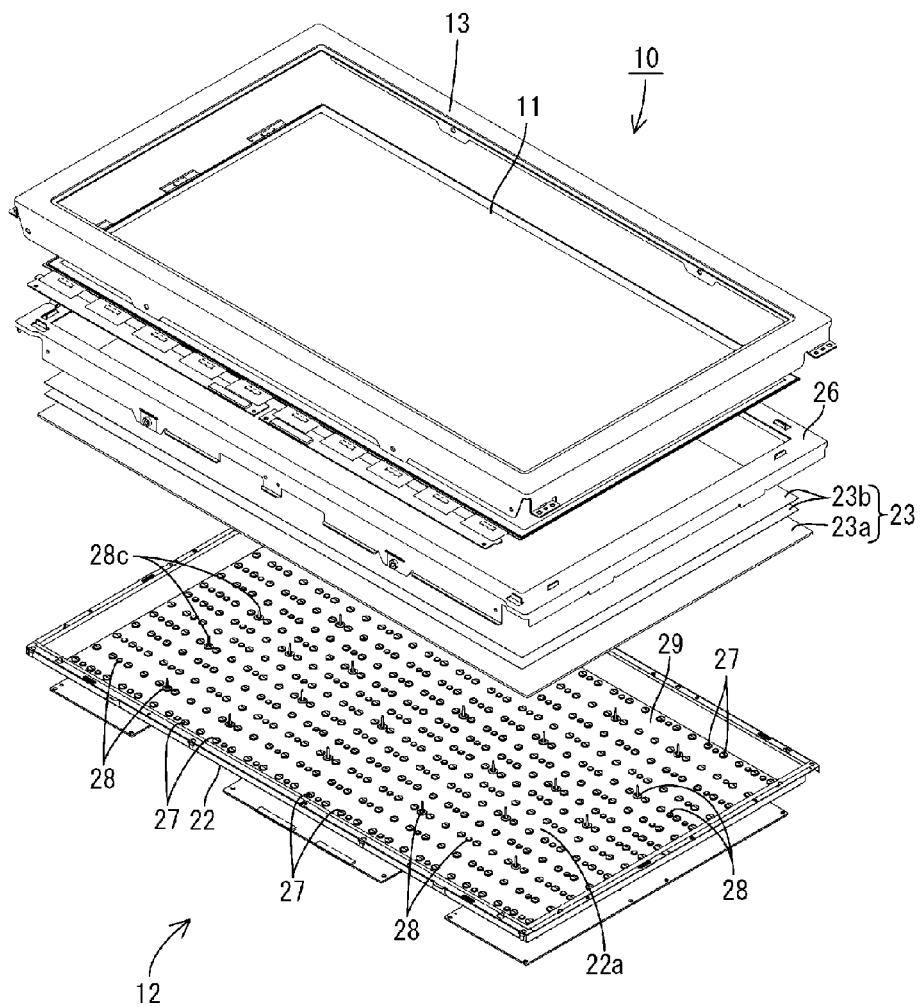
FIG. 2 is an exploded perspective view showing a schematic configuration of a liquid crystal display device.

As shown in FIG. 1, a television receiver TV of the present embodiment includes a liquid crystal display device 10 that is a display device, front and rear cabinets Ca and Cb that house the liquid crystal display device 10 therebetween, a power circuit substrate P for supplying power, a tuner (receiver) T that can receive a television image signal, an image conversion circuit substrate VC that converts the television image signal outputted from the tuner T to an image signal for the liquid crystal display device 10, and a stand S. The liquid crystal display device 10 is formed in a horizontally elongated quadrilateral (rectangular) shape as a whole, and is housed such that the longer side direction thereof substantially matches the horizontal direction (X axis direction) and the shorter side direction thereof matches the vertical direction (Y direction), respectively. As shown in FIG. 2, the liquid crystal display device 10 includes a liquid crystal panel 11 that is a display panel, and a backlight device (illumination device) 12 that is an external light source, and these are held together by a frame-shaped bezel 13 or the like.

(Liquid Crystal Panel)

Figure 3:
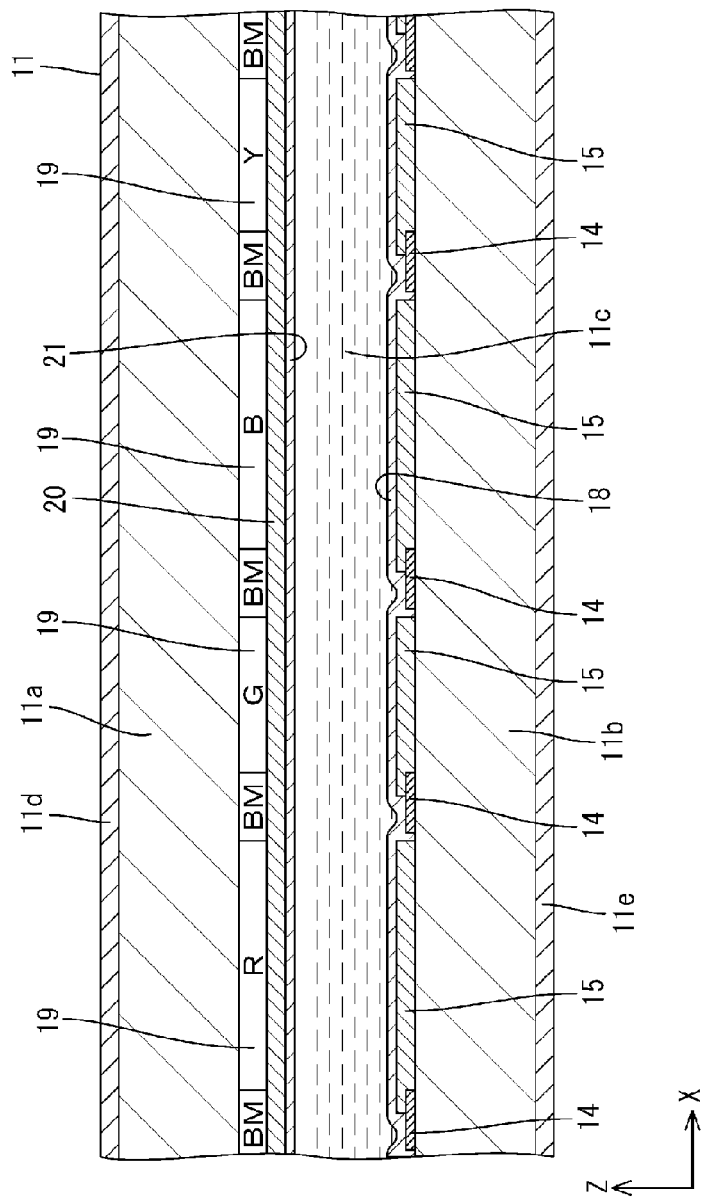
FIG. 3 is a cross-sectional view that shows a cross-sectional configuration of the liquid crystal panel along the longer side direction.

A configuration of the liquid crystal panel 11 in the liquid crystal display device 10 will be explained. The liquid crystal panel 11 has a horizontally elongated rectangular shape overall, and as shown in FIG. 3, includes a pair of transparent (having light-transmitting properties) glass substrates 11a and 11b, and a liquid crystal layer 11c including liquid crystal, which is a substance that undergoes changes in optical properties based on an applied electric field, interposed between the substrates 11a and 11b. The substrates 11a and 11b are bonded together by a sealing member (not shown) such that a gap equal to the thickness of the liquid crystal layer is maintained therebetween. On the respective outer surfaces of the two substrates 11a and 11b, polarizing plates 11d and 11e are bonded. The longer side direction of the liquid crystal panel 11 matches the X axis direction, and the shorter side direction thereof matches the Y axis direction.

Figure 4:
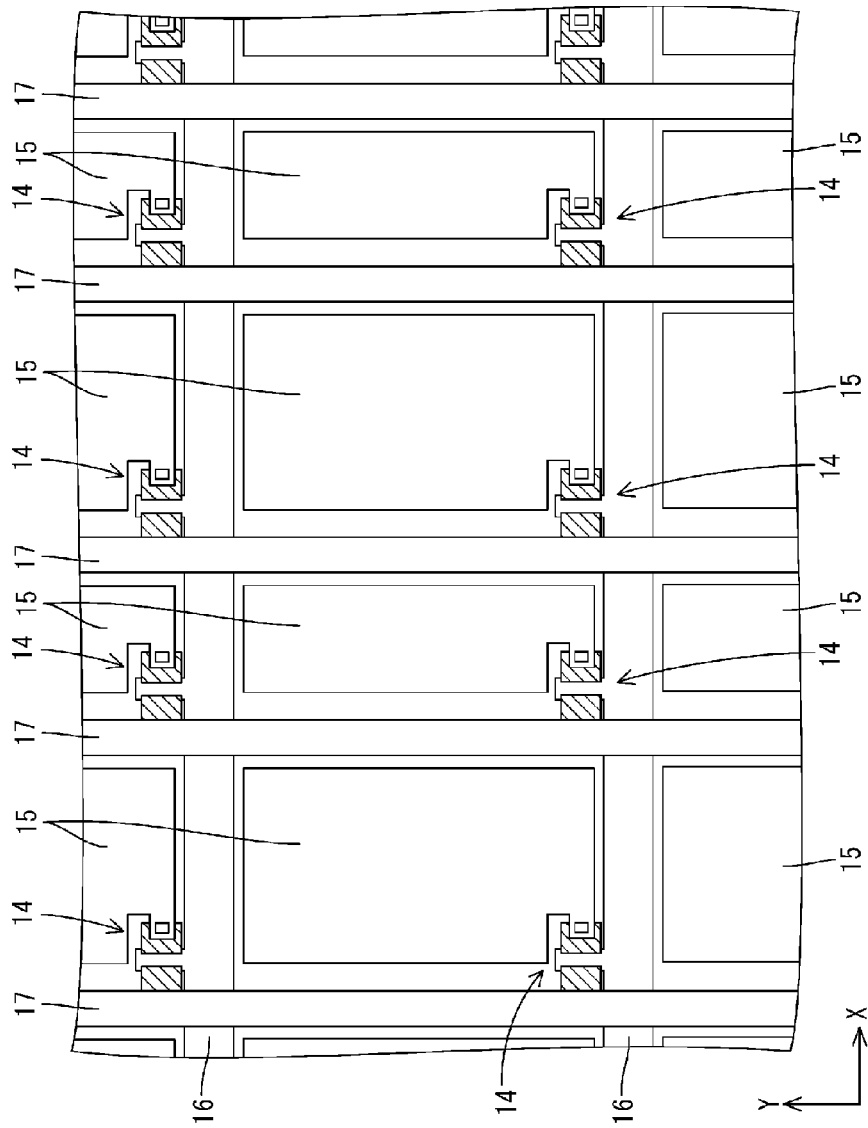
FIG. 4 is a magnified plan view that shows a plan view configuration of an array substrate.

Of the two substrates 11a and 11b, one on the front side (front surface side) is a CF substrate 11a, and the other on the rear side (rear surface side) is an array substrate 11b. On the inner surface of the array substrate 11b, or in other words, the surface thereof facing the liquid crystal layer 11c (facing the CF substrate 11a), as shown in FIG. 4, a plurality of TFTs (thin film transistors) 14 that are switching elements and pixel electrodes 15 are arranged in a matrix, and the respective TFTs 14 and pixel electrodes 15 are surrounded by gate wiring lines 16 and source wiring lines 17 forming a grid pattern. Each pixel electrode 15 has a vertically elongated quadrilateral (rectangular) shape with the longer side direction matching the Y axis direction and the shorter side direction matching the X axis direction, and is made of a transparent electrode such as ITO (indium tin oxide) or ZnO (zinc oxide). The gate wiring lines 16 and the source wiring lines 17 are respectively connected to the gate electrodes and the source electrodes of the TFTs 14, and the pixel electrodes 15 are connected to the drain electrodes of the TFTs 14, respectively. As shown in FIG. 3, an alignment film 18 for defining the orientation of liquid crystal molecules is disposed on the TFTs 14 and the pixel electrodes 15 on the side facing the liquid crystal layer 11c. On an end of the array substrate 11b, a terminal portion to which the gate wiring lines 16 and the source wiring lines 17 are drawn is formed, and driver portions (not shown) for driving the liquid crystal are crimp-connected to the terminal portion through an anisotropic conductive film (ACF), and the driver portions for driving the liquid crystal are electrically connected to a display control circuit substrate (not shown) through various wiring line substrates. The display control circuit substrate is connected to the image conversion circuit substrate VC in the television receiver TV (see FIG. 1), and supplies driving signals to the respective wiring lines 16 and 17 through the driver parts in accordance with output signals from the image conversion circuit substrate VC.

Figure 5:
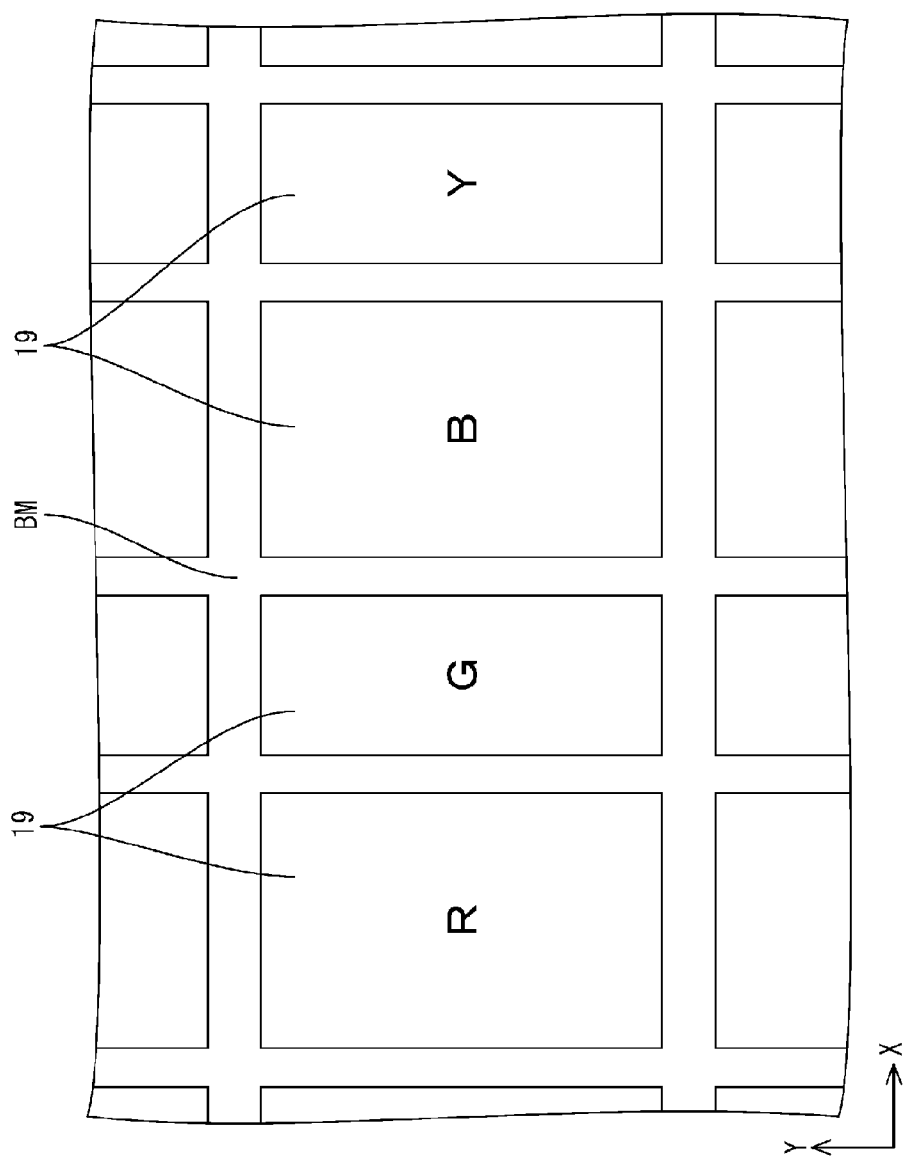
FIG. 5 is a magnified plan view that shows a plan view configuration of a CF substrate.

On the other hand, as shown in FIG. 5, the inner surface of the CF substrate 11a, or in other words, the surface thereof facing the liquid crystal layer 11c (facing the array substrate 11b) is provided with color filters 19 including a plurality of colored portions R, G, B, and Y arranged in a matrix, each of which corresponds to a pixel on the array substrate 11b. The color filters 19 of the present embodiment include a yellow colored portion Y in addition to colored portions of the three primary colors of light, which are a red colored portion R, a green colored portion G, and a blue colored portion B. These colored portions R, G, B, and Y selectively allow light of the corresponding color (wavelength) to pass through. Each of the colored portions R, G, B, and Y is formed in a vertically elongated quadrilateral (rectangular) shape with the longer side direction matching the Y axis direction and the shorter side direction matching the X axis direction, respectively, in a manner similar to the pixel electrodes 15. A grid-shaped light-shielding layer (black matrix) BM is disposed between the respective colored portions R, G, B, and Y to prevent the colors from being mixed. As shown in FIG. 3, in the CF substrate 11a, an opposite electrode 20 and an alignment film 21 are formed in this order on the surface of the color filters 19 facing the liquid crystal layer 11c.

The arrangement and size of the respective colored portions R, G, B, and Y constituting the color filters 19 will be explained in detail. As shown in FIG. 5, the respective colored portions R, G, B, and Y are arranged in a matrix with the X axis direction as the row direction and the Y axis direction as the column direction. The column direction (Y axis direction) sizes of the respective colored portions R, G, B, and Y are all the same, but the row direction (X axis direction) sizes differ for the respective colored portions R, G, B, and Y. Specifically, the respective colored portions R, G, B, and Y are aligned in the row direction in the order of the red colored portion R, the green colored portion G, the blue colored portion B, and the yellow colored portion Y from the left side of FIG. 5, and among these, the row direction sizes of the red colored portion R and the blue colored portion B are greater than the row direction sizes of the yellow colored portion Y and the green colored portion G. In other words, the colored portions R and B, which have relatively large row direction sizes, and the colored portions G and Y, which have relatively small row direction sizes, are arranged repeatedly in an alternating fashion in the row direction. Accordingly, the area of the red colored portion R and the blue colored portion B is larger than the area of the green colored portion G and the yellow colored portion Y. The area of the blue colored portion B is equal to the area of the red colored portion R. Similarly, the area of the green colored portion G and the area of the yellow colored portion Y are equal to each other. FIGS. 3 and 5 show a case in which the area of the red colored portions R and the blue colored portions B is approximately 1.6 times larger than the area of the yellow colored portions Y and the green colored portions G.

As a result of the color filters 19 having the above-mentioned configuration, in the array substrate 11b, as shown in FIG. 4, the size of the pixel electrodes 15 in the row direction (X axis direction) differs from each other among respective columns. In other words, the row direction size and area of pixel electrodes 15 that face the red colored portion R and the blue colored portion B are larger than the row direction size and area of pixel electrodes 15 that face the yellow colored portion Y and the green colored portion G. The gate wiring lines 16 are all arranged at an equal pitch, while the source wiring lines 17 are arranged at two different pitches corresponding to the sizes of the pixel electrodes 15 in the row direction.

As described above, the liquid crystal display device 10 of the present embodiment has a liquid crystal panel 11 with color filters 19 including four colored portions R, G, B, and Y, and thus, as shown in FIG. 1, the television receiver TV includes a specialized image conversion circuit substrate VC. In other words, this image conversion circuit substrate VC can convert the television image signals outputted from the tuner T into image signals of respective colors of blue, green, red, and yellow, and can output the generated image signals of the respective colors to the display control circuit substrate. The display control circuit substrate drives TFTs 14 provided for pixels of respective colors in the liquid crystal panel 11 through the respective wiring lines 16 and 17 based on these image signals, thereby appropriately controlling the transmission of light through the respective colored portions R, G, B, and Y of the respective colors.

(Backlight Device)

Next, a configuration of the backlight device 12 of the liquid crystal display device 10 will be explained. As shown in FIG. 2, the backlight device 12 includes a box-shaped chassis 22 that is open on the light-exiting side (towards the liquid crystal panel 11), a group of optical members 23 disposed so as to cover the open portion of the chassis 22, and a frame 26 that is disposed along the outer edge of the chassis 22 and sandwiches the outer edge of the group of optical members 23 with the chassis 22. The chassis 22 includes LEDs 24 disposed immediately below the optical members 23 (liquid crystal panel 11) so as to face the optical members 23, LED substrates 25 on which the LEDs 24 are mounted, and diffusion lenses 27 attached to the LED substrates 25 in positions where the LEDs 24 are disposed. Accordingly, the backlight device 12 of the present embodiment is of a so-called direct lighting type. The chassis 22 further includes holding members 28 that can hold the LED substrates 25 on the chassis 22, and a reflective sheet 29 that reflects light inside of the chassis 22 toward the optical members 23. Next, each component of the backlight device 12 will be described in detail below.

(Chassis)

Figure 6:
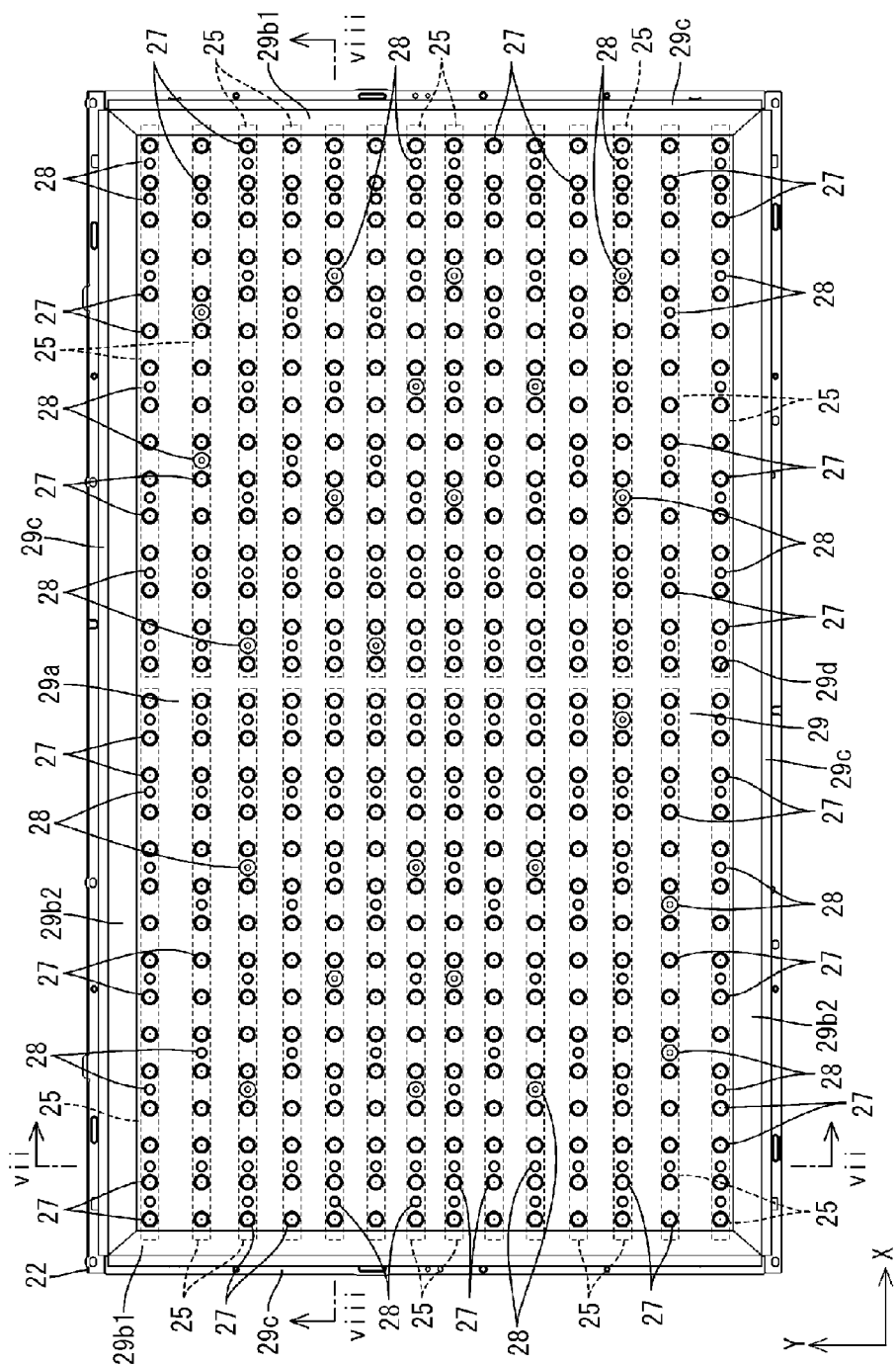
FIG. 6 is a plan view showing a configuration of a diffusion lens, an LED substrate, a protective member, a reflective sheet, and the like in the chassis included in the backlight device.
Figure 7:
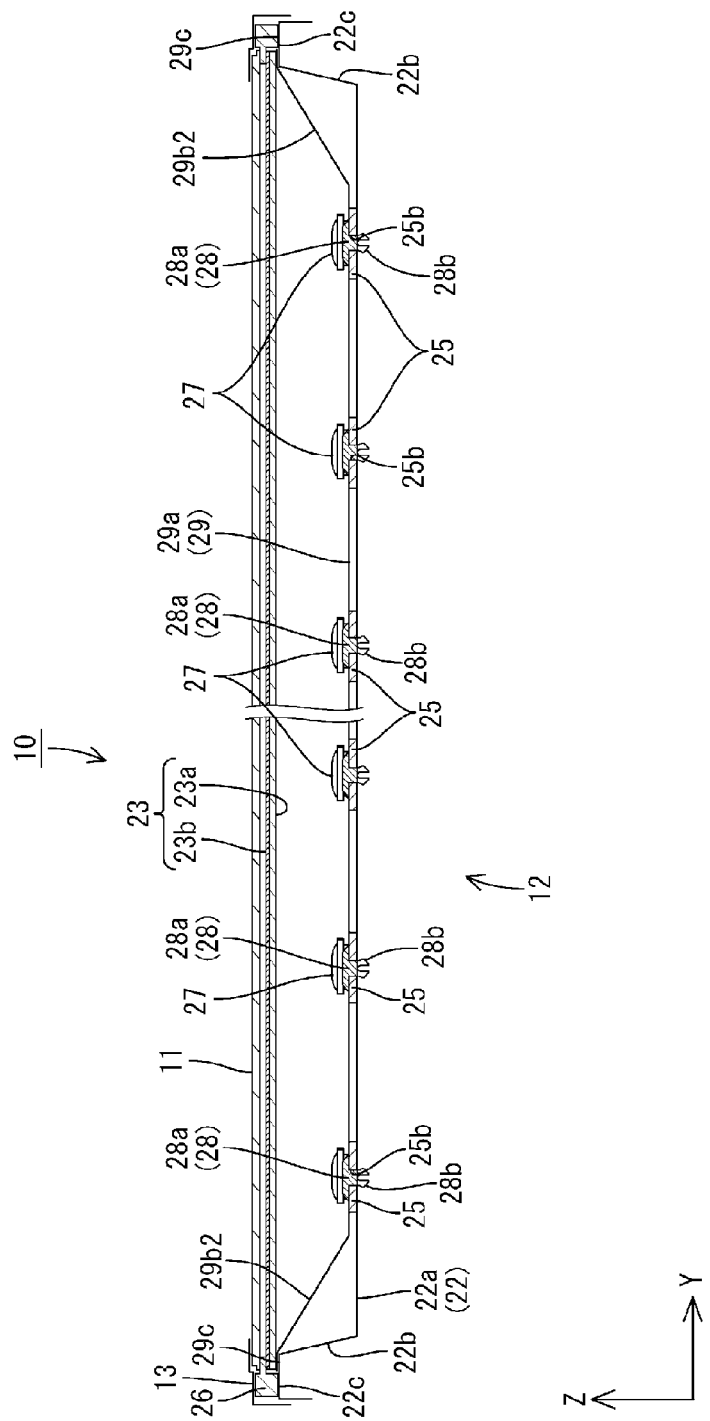
FIG. 7 is a cross-sectional view showing a cross-sectional configuration of the liquid crystal display device in the shorter side direction (the line vii-vii in FIG. 6).
Figure 8:
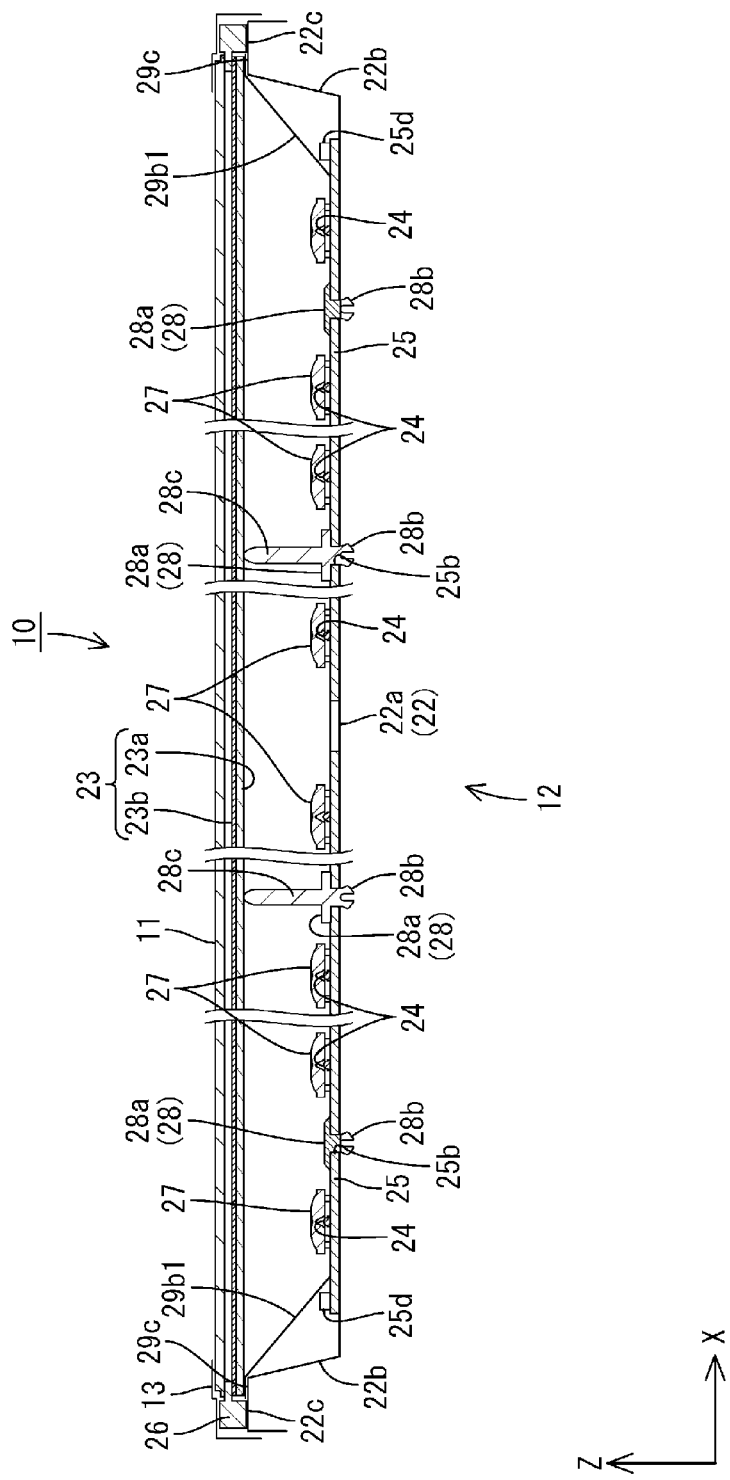
FIG. 8 is a cross-sectional view showing a cross-sectional configuration of the liquid crystal display device in the longer side direction (the line viii-viii in FIG. 6).

The chassis 22 is made of metal, and as shown in FIGS. 6 to 8, the chassis 22 includes a bottom plate 22a that is a horizontally elongated quadrilateral (rectangle) similar to the liquid crystal panel 11, side plates 22b that rise towards the front (light-exiting side) from the outer edges of the respective sides (one pair of long sides and one pair of short sides) of the bottom plate 22a, and a receiving plate 22c that juts outward from the top edges of the respective side plates 22b, thus forming a shallow substantially box shape (substantially shallow tray shape) overall that is open towards the front. In the chassis 22, the longer side direction thereof matches the X axis direction (horizontal direction), and the shorter side direction thereof matches the Y axis direction (vertical direction). The frame 26 and the optical members 23, which will be described below, can be placed, from the front side, on respective supporting plates 22c of the chassis 22. The frame 26 is screwed onto the respective supporting plates 22c. The bottom plate 22a of the chassis 22 has formed therein openings that are attachment holes for attaching the holding members 28. A plurality of attachment holes are dispersed throughout the bottom plate 22a in positions where the holding members 28 are to be attached.

(Optical Members)

As shown in FIG. 2, the optical members 23 are in a horizontally elongated rectangular shape in a plan view, as in the liquid crystal panel 11 and the chassis 22. As shown in FIGS. 7 and 8, the outer edges of the optical members 23 are placed on the supporting plates 22c, thereby covering the open portion of the chassis 22 and being interposed between the liquid crystal panel 11 and the LEDs 24 (LED substrates 25). The optical members 23 include a diffusion plate 23a disposed on the rear side (LEDs 24 side, opposite to the side toward which light is emitted), and optical sheets 23b disposed on the front side (liquid crystal panel 11 side, the side toward which light is emitted). The diffusion plate 23a has a configuration in which a plurality of diffusion particles are dispersed inside a plate-shaped base material made of an almost completely transparent resin having a prescribed thickness, and has the function of diffusing light that is transmitted therethrough. The optical sheets 23b are thinner than the diffusion plate 23a, and two optical sheets 23b are stacked, one on top of the other. Specific types of optical sheets 23b include a diffusion sheet, a lens sheet, a reflective polarizing sheet, and the like, for example, and it is possible to appropriately choose any of these as optical sheets 23b.

(Frame)

As shown in FIG. 2, the frame 26 is formed in a frame shape along the outer edges of the liquid crystal panel 11 and the optical members 23. The outer edges of the optical members 23 can be sandwiched between the frame 26 and the receiving plate 22c (refer to FIGS. 7 and 8). The frame 26 receives the outer edges of the liquid crystal panel 11 from the rear side thereof, and sandwiches the outer edges of the liquid crystal panel 11 with the bezel 13 that is disposed on the front side (refer to FIGS. 7 and 8).

(LEDs)

As shown in FIG. 8, the LEDs 24 are mounted on the LED substrate 25, and are so-called top type LEDs in which light-emitting surfaces are on the top surface opposite to the mounting surface by which the LEDs 24 are mounted on the LED substrate 25. Each LED 24 includes an LED chip that is a light-emitting source that emits blue light, and a green phosphor and a red phosphor as phosphors that emit light by being excited by the blue light. Specifically, each LED 24 has a configuration in which an LED chip made of an InGaN type material, for example, is sealed by a resin material onto a base plate that is attached to the LED substrate 25. The LED chip mounted on the base plate has a primary luminescence wavelength in a range of 420 nm to 500 nm, i.e., the blue wavelength region, and can emit highly pure blue light (single color blue light). The specific primary luminescence wavelength of the LED chip is preferably 451 nm, for example. On the other hand, the resin material that seals the LED chip has the green phosphor that emits green light by being excited by blue light emitted from the LED chip, and the red phosphor that emits red light by being excited by the blue light emitted from the LED chip, the green phosphor and the red phosphor being dispersed in the resin material at a prescribed ratio. By the blue light (light having a blue component) emitted from the LED chip, the green light (light having a green component) emitted from the green phosphor, and the red light (light having a red component) emitted from the red phosphor, the LED 24 can emit light of a prescribed color overall such as white light or white light with a bluish tone, for example. Because yellow light can be obtained by mixing the light from the green phosphor having a green component and the light from the red phosphor having a red component, it can also be said that this LED 24 emits a mixture of the blue component light from the LED chip and yellow component light. The chromaticity of the LED 24 changes based on the absolute value or the relative value of the quantity of green phosphor and red phosphor included, for example, and thus, it is possible to adjust the chromaticity of the LED 24 by appropriately adjusting the amount of green phosphor and red phosphor included. In the present embodiment, the green phosphor has a primary luminescence peak in the green wavelength region from 500 nm to 570 nm inclusive, and the red phosphor has a primary luminescence peak in the red wavelength region from 600 nm to 780 nm inclusive.

Next, the green phosphor and the red phosphor included in the LED 24 will be explained in detail. It is preferable that β-SiAlON, which is a type of SiAlON phosphor, be used as the green phosphor. The SiAlON type phosphor is a substance obtained by replacing some of silicon atoms of silicon nitride with aluminum atoms, and by replacing some of the nitrogen atoms thereof with oxygen atoms; in other words, the SiAlON is a nitride. The SiAlON phosphor that is a nitride has superior light-emitting efficiency and durability to those of other phosphors made of a sulfide or an oxide, for example. Here, "having superior durability" specifically means that the brightness is less likely to deteriorate over time even after being exposed to high-energy exciting light from the LED chip. In the SiAlON phosphor, a rare earth element (such as Tb, Yg, or Ag) is used as an activator. β-SiAlON, which is a type of SiAlON phosphor, is a substance represented by a general formula $Si_{6-z}Al_zO_zN_{8-z}$:Eu (z representing solid solubility) or $(Si, Al)_6(O, N)_8$:Eu in which aluminum and oxygen are dissolved in a solid solution in β-type silicon nitride crystals. In the β-SiAlON of the present embodiment, Eu (europium) is used as the activator, for example, and because the use of Eu contributes to high purity in the color green in the emitted light, it is very useful for adjusting the chromaticity of the LED 24. On the other hand, it is preferable to use CASN, which is a type of CASN type phosphor, as the red phosphor. The CASN type phosphor is a nitride that includes calcium atoms (Ca), aluminum atoms (Al), silicon atoms (Si), and nitrogen atoms (N), and has superior light-emitting efficiency and durability compared to other phosphors made of a sulfide or oxide, for example. In the CASN type phosphor, a rare earth element (such as Tb, Yg, or Ag) is used as an activator. CASN, which is a type of the CASN type phosphor, includes Eu (europium) as an activator, and is represented by a compositional formula of $CaAlSiN_3$:Eu $CaAlSiN_3$:Eu.

(LED Substrate)

As shown in FIG. 6, the LED substrate 25 has a base member 25a that is in a horizontally elongated rectangular shape in a plan view, and is housed in the chassis 22 so as to extend along the bottom plate 22a with the longer side direction thereof matching the X axis direction and the shorter side direction thereof matching the Y axis direction. Of the plate surfaces of the base member 25a of the LED substrate 25, LEDs 24 are mounted on the plate surface facing the front (facing the optical members 23), and this is designated as the mounting surface 25a1. The mounted LEDs 24 are disposed such that the light-emitting surfaces face the optical members 23 (liquid crystal panel 11) and such that the optical axis thereof matches the Z axis direction, or in other words, the direction perpendicular to the display screen of the liquid crystal panel 11. A plurality (15 in FIG. 6, for example) of LEDs 24 are aligned in a row in the longer side direction (X axis direction) of the LED substrate 25, and wiring patterns (wiring line member) 25c connected to the aligned LEDs 24 are formed (refer to FIG. 9). The pitch between the respective LEDs 24 on the LED substrate 25 is substantially even; in other words, the LEDs 24 are disposed at substantially equal gaps along the X axis direction.

As shown in FIG. 6, a plurality of LED substrates 25 having the above-mentioned configuration are disposed in the chassis 22 along the X axis direction and the Y axis direction, respectively, such that the respective long sides are aligned along the same direction and the respective short sides aligned along the same direction. In other words, the LED substrates 25 and the LEDs 24 mounted thereon are arranged in a matrix (in a plane) in the chassis 22 with the row direction being the X axis direction (longer side direction of the chassis 22 and the LED substrates 25), and with the column direction being the Y axis direction (shorter side direction of the chassis 22 and the LED substrate 25). Specifically, there are 28 LED substrates 25 in total arranged in a matrix in the chassis 22, with two each in the X axis direction (row direction) and 14 each in the Y axis direction (column direction). The LED substrates 25 are aligned in the Y axis direction at a so-called uneven pitch in which the pitch differs depending on the position. Specifically, the pitch thereof is narrower, the closer the LED substrates 25 are to the center in the Y axis direction of the chassis 22 (liquid crystal display device 10), and wider, the closer to the edges of the chassis 22 the LED substrates 25 are in the Y axis direction. The respective LEDs 24 mounted on the respective LED substrates 25 are also similarly disposed at an uneven pitch in the Y axis direction. Among both ends of each LED substrate 25 in the longer side direction, the end on the outer edge side of the chassis 22 in the longer side direction (end opposite to where adjacent LED substrates 25 meet in the X axis direction) is provided with a connector 25d (refer to FIG. 8) that is electrically connected to an end of the wiring pattern 25c, and the driving of the respective LEDs 24 on the LED substrates 25 can be controlled by the connector 25d being electrically connected to a connector on an external LED driver circuit. At the position of the LED substrate 25 corresponding to where the holding members 28 are to be attached, through holes 25b through which the holding members 28 are to penetrate are formed (refer to FIGS. 7 and 8).

(Diffusion Lens)

The diffusion lenses 27 are made of a synthetic resin material (such as polycarbonate or acryl) that is almost completely transparent (having a high light transmittance) and that has a refractive index higher than the air. As shown in FIGS. 6 and 8, the diffusion lenses 27 have a prescribed thickness and are each formed in a substantially circular shape in a plan view. Each of the diffusion lenses 27 is attached to the mounting surface 25a1 of the LED substrate 25 so as to individually cover the front side of an LED 24, or in other words, so as to be placed over an LED 24 in a plan view. The diffusion lens 27 diffuses light from the LED 24 having great directivity and outputs this light. That is, the directivity of the light emitted from the LED 24 is lessened as the light passes through the diffusion lens 27, and therefore, even when a gap between adjacent LEDs 24 is made larger, an area therebetween becomes less likely to be recognized as a dark area. This makes it possible to reduce the number of LEDs 24 that need to be provided. The diffusion lenses 27 are positioned such that the respective centers thereof substantially match the centers of the respective LEDs 24 in a plan view. FIG. 7 shows a cross-sectional configuration of the holding members 28, and therefore, in terms of the diffusion lenses 27, the side faces of the diffusion lenses 27 that are positioned behind the holding members 28 on the page are shown.

Figure 9:
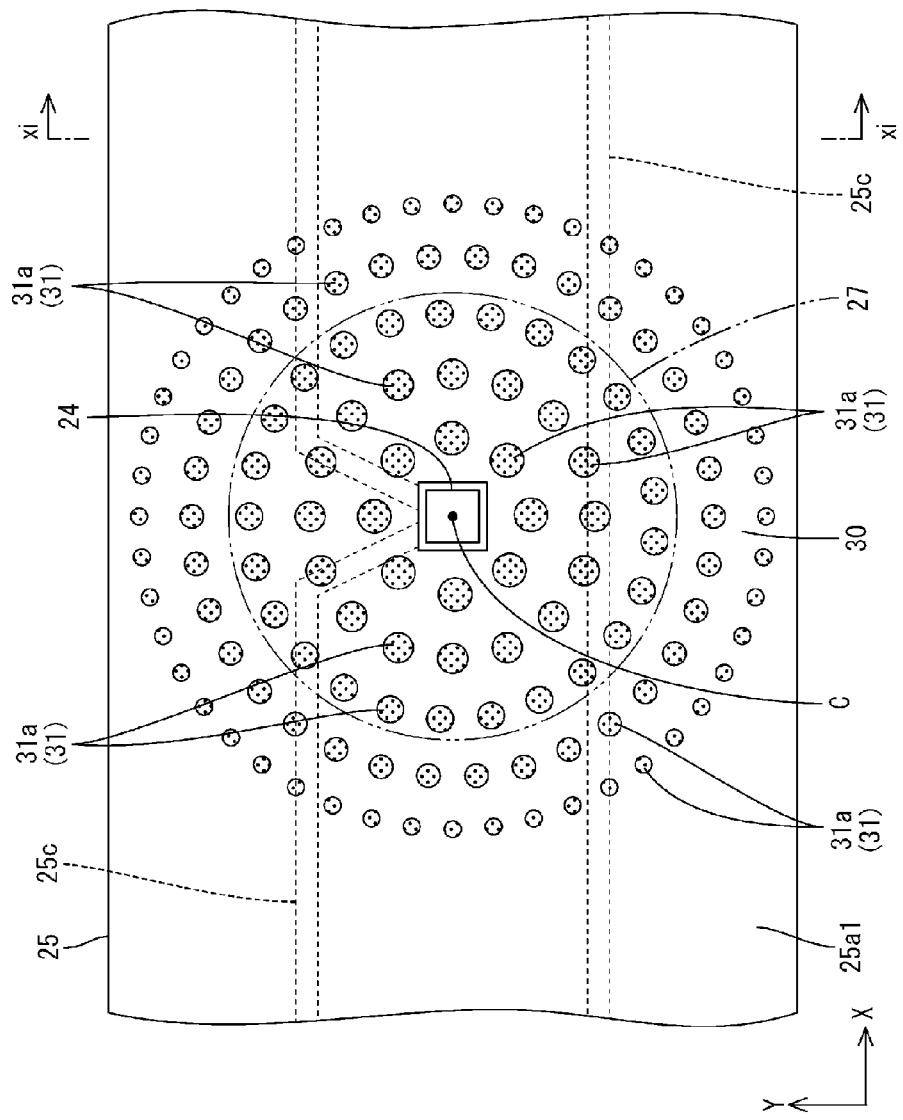
FIG. 9 is a magnified plan view of the vicinity of an LED on the LED substrate included in the backlight device.
Figure 10:
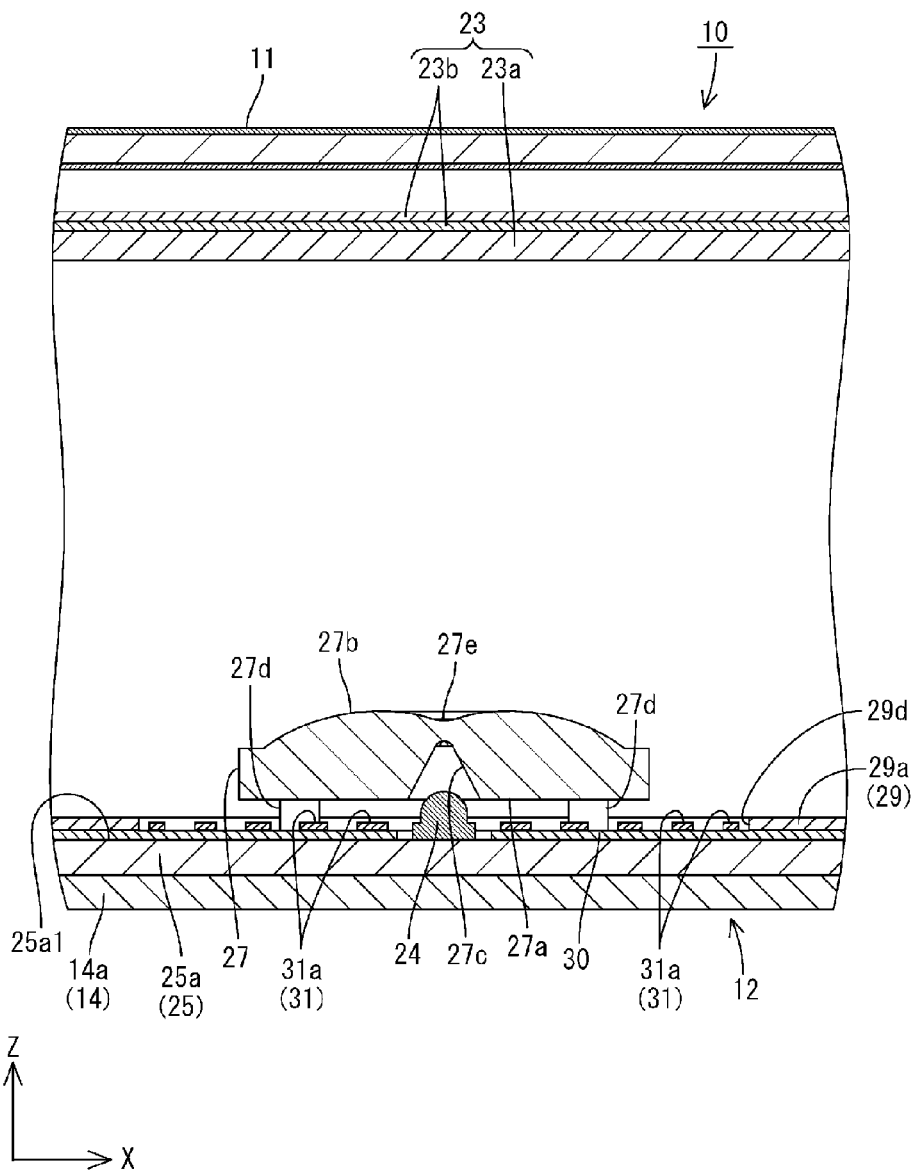
FIG. 10 is a magnified cross-sectional view of the vicinity of the LED and the diffusion lens in FIG. 8.

Specifically, as shown in FIG. 9, the diffusion lenses 27 have a diameter sufficiently greater than the external size of the LEDs 24, but slightly smaller than the width of the LED substrates 25. As shown in FIG. 10, the surface of the diffusion lens 27 facing the LED 24 to the rear is a light-receiving surface 27a where light from the LED 24 enters, while the surface of the diffusion lens 27 facing the optical members 23 to the front is a light-exiting surface 27b from which light exits. The light-receiving surface 27a has a flat surface overall that is parallel to the plate surface (X axis direction and Y axis direction) of the LED substrate 25, but has an inclined surface that is inclined with respect to the light axis of the LED 24, by having a light-receiving side concavity 27c formed in a region of the light-receiving surface 27a corresponding in position to the LED 24 in a plan view. The light-receiving side concavity 27c is formed substantially in the center of the diffusion lens 27 while forming a substantially conical shape that is V-shaped in a cross-sectional view. Light that is emitted from the LED 24 and subsequently enters the light-receiving side concavity 27c then enters the diffusion lens 27 while being refracted to a wide angle by the inclined surface. Also, attaching legs 27d that are structures for attachment to the LED substrate 25 protrude from the vicinity of the outer edges of the light-receiving surface 27a, and these attaching legs 27d are fixed to the mounting surface 25a1 of the LED substrate 25 by an adhesive agent or the like. The light-exiting surface 27b is formed into a flat substantially spherical shape that protrudes towards the front, and with this configuration, it is possible to refract light that exits the diffusion lens 27 at a wide angle. The region of the light-exiting surface 27b that overlaps the LED 24 in a plan view has formed thereon a substantially bowl-shaped light-exiting side concavity 27e. This light-exiting side concavity 27e allows a large amount of light from the LED 24 to be refracted and emitted at a wide angle, or for some of the light to be reflected from the LED 24 back to the LED substrate 25.

(Holding Member)

The holding members 28 will be explained. The holding members 28 are made of a synthetic resin such as polycarbonate, and the surfaces thereof are a highly reflective white. As shown in FIGS. 6 to 8, the holding members 28 each have a main part 28a along the plane of the LED substrate 25 and a fixing part 28b that protrudes from the main part 28a toward the rear side, or in other words, toward the chassis 22 and that is attached to the chassis 22. The main part 28a is formed in a substantially circular plate shape in a plan view, and can sandwich the LED substrate 25 with at least the bottom plate 22a of the chassis 22. The fixing part 28b can be attached to the bottom plate 22a by being inserted through an insertion hole 25b and an attachment hole that are respectively formed in the LED substrate 25 and the bottom plate 22a of the chassis 22 in a position corresponding to where each holding member 28 is to be attached. As shown in FIG. 6, a plurality of holding members 28 are appropriately dispersed throughout the surface of the LED substrate 25, and are adjacent to the respective diffusion lenses 27 (LEDs 24) with respect to the X axis direction.

As shown in FIGS. 6 and 8, among the holding members 28 are a first holding member that sandwiches the LED substrate 25 between the main part 28a and the bottom plate 22a of the chassis 22 without a bottom section 29a of the reflective sheet 29 therebetween, and a second holding member that sandwiches the LED substrate 25 and the bottom section 29a of the reflective sheet 29 between the main part 28a and the bottom plate 22a of the chassis 22. Among them, the holding members 28 that hold the LED substrates 25 and the bottom section 29a of the reflective sheet 29 (second holding members) include two types: holding members provided with supporting parts 28c that protrude from the main parts 28a toward the front side; and holding members that do not have the supporting parts 28c. The supporting parts 28c can support the optical members 23 from the rear (directly supporting the diffusion plate 23a), and as a result, it is possible to maintain an even positional relation in the Z axis direction between the LEDs 24 and the optical members 23, and to mitigate unwanted deformations in the optical members 23.

(Reflective Sheet)

The reflective sheet 29 is made of a synthetic resin, and the surface thereof is a highly reflective white. As shown in FIGS. 6 to 8, the reflective sheet 29 is large enough to be laid over almost the entire inner surface of the chassis 22, and therefore, it is possible to cover all of the LED substrates 25 arranged in rows in the chassis 22 from the front side thereof. With the reflective sheet 29, light inside of the chassis 22 can be efficiently directed toward the optical members 23. The reflective sheet 29 is constituted of a bottom section 29a extending along the bottom plate 22a of the chassis 22 and having a size large enough to cover a large portion of the bottom plate 22a, four rising portions 29b that rise towards the front from the respective outer edges of the bottom plate 29a and that are inclined in relation to the bottom section 29a, and extension portions 29c that extend towards the outside from the outer edges of the rising portions 29b and that are placed on the receiving plate 22c of the chassis 22. The bottom section 29a of the reflective sheet 29 is disposed so as to overlap the front surface of the respective LED substrates 25, or in other words the surface to the front of the mounting surface 25a1 for the LEDs 24. As shown in FIG. 10, the bottom section 29a of the reflective sheet 29 is provided with lens insertion holes (light source insertion holes) 29d for inserting the respective diffusion lenses 27 and LEDs 24, the lens insertion holes 29d corresponding in position to the respective diffusion lenses 27 and LEDs 24 in a plan view. The lens insertion hole 29d has a diameter greater than the outer diameter of the diffusion lens 27, and thus, it is possible to guarantee that the diffusion lens 27 can be inserted therein even if there are margins of error in the sizes or in assembly during manufacturing. Thus, on the mounting surfaces 25a1 of the LED substrates 25, portions not covered by the bottom section 29a of the reflective sheet 29, or in other words, portions exposed on the front through the lens insertion holes 29d are present.

As shown in FIGS. 7 and 8, the bottom section 29a also has openings that are holding member insertion holes through which the fixing parts 28b are inserted in positions corresponding to the respective holding members 28 in a plan view, and the holding member insertion holes for the holding members 28 that hold the LED substrates 25 without having the bottom section 29a therebetween (first holding members), in particular, are formed to be large enough to allow the main parts 28a thereof to also pass through. As a result, it is possible to hold the LED substrates 25 housed in the chassis 22 onto the bottom plate 22a of the chassis 22 by the holding members 28 (first holding members), and when laying the reflective sheet 29 into the chassis 22 thereafter, a situation in which the bottom section 29a rises onto the main parts 28a of the holding members 28 (first holding members) is avoided. The bottom section 29a is affixed to the chassis 22 together with the LED substrates 25 by the holding members 28 (second holding members) that are attached after the reflective sheet 29 is placed inside the chassis 22, thereby preventing the reflective sheet 29 from being raised or warped.

(Purposes of Having Four Primary Colors in Liquid Crystal Panel and Differentiating Areas of Respective Colored Portions of Color Filters)

As stated previously, the color filters 19 of the liquid crystal panel 11 of the present embodiment have a yellow colored portion Y in addition to the colored portions R, G, and B of the three primary colors of light, as shown in FIGS. 3 and 5, and thus, the color gamut for images displayed by transmitted light is expanded, allowing excellent color reproduction during display. In addition, because the light that is transmitted through the yellow colored portions Y has a wavelength close to the luminosity peak, it tends to be perceived by human eyes as bright light even with a small amount of energy. As a result, even if the power output of the LEDs 24 in the backlight device 12 is reduced, sufficient brightness can be obtained, thereby achieving effects such as a reduction in power consumption of the LEDs 24 and thus excellent environmental performance.

On the other hand, when using the liquid crystal panel 11 having four primary colors as described above, the display image on the liquid crystal panel 11 tends to have a yellowish tone as a whole. In order to avoid this, in the backlight device 12 of the present embodiment, the chromaticity of the LEDs 24 is adjusted to have a bluish tone, blue being a complementary color of yellow, such that the chromaticity of the display image is corrected. For this reason, the LEDs 24 provided in the backlight device 12 have the primary luminescence wavelength in the blue wavelength region as mentioned above, and emit light in the blue wavelength region at the highest intensity.

The research conducted by the inventor of the present invention shows that, when adjusting the chromaticity of the LEDs 24 as described above, as the chromaticity is made closer to blue than to white, the brightness of the emitted light tends to be lowered. In the present embodiment, the proportion of area taken up by the blue colored portion B included among the color filters 19 is larger than those of the green colored portion G and the yellow colored portion Y, and thus, it is possible to include as much blue light as possible, blue being a complementary color of yellow, in the light transmitted through the color filters 19. This way, when adjusting the chromaticity of the LEDs 24 to correct the chromaticity of the display image, it is not necessary to adjust the chromaticity of the LEDs 24 toward the blue color as much as before, and as a result, it is possible to prevent the brightness of the LEDs 24 from decreasing due to chromaticity adjustment.

Furthermore, according to the research conducted by the inventor of the present invention, when using the liquid crystal panel 11 having four primary colors, the brightness of the red color in particular is lowered among the light emitted from the liquid crystal panel 11. A possible cause thereof is that, in the liquid crystal panel 11 having four primary colors, the number of subpixels constituting one pixel is increases from three to four, thus reducing the area of each subpixel compared to a liquid crystal panel having three primary colors, and as a result, the brightness of the red color in particular is lowered. In the present embodiment, the proportion of area taken up by the red colored portion R included among the color filters 19 is larger than those of the green colored portions G and the yellow colored portions Y, and thus, as much red light as possible is included among the light transmitted through the color filters 19, which allows a decrease in brightness of red light, which results from increasing the number of colors for the color filter 19 to four, to be mitigated.

(Description of Configuration of Main Part of the Present Embodiment)

Figure 11:
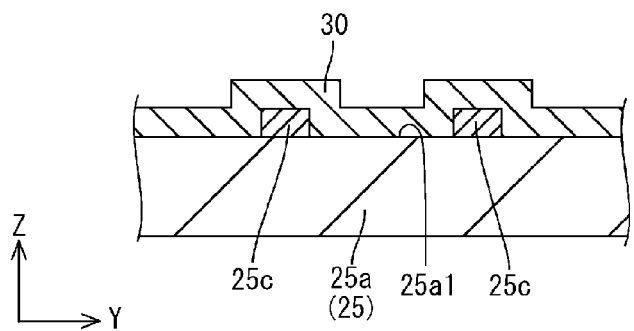
FIG. 11 is a cross-sectional view of FIG. 9 along the line xi-xi.

As shown in FIGS. 9 to 11, among the mounting surfaces 25a1, for the LEDs 24, of the base members 25a constituting the LED substrates 25 of the present embodiment, at least the portions within the lens insertion holes 29d have formed therein first light-reflecting layers 30 covering the wiring patterns 25c, and second light-reflecting layer 31 having a light reflectance different from that of the first light-reflecting layers 30 is formed so as to partially cover the first light-reflecting layers 30 (so as to overlap portions of the first light-reflecting layers 30). The base member 25a of the LED substrate 25 is made of a metal such as the same aluminum-type material as the chassis 22, and an insulating layer (not shown) is formed on the surface thereof. Thus, as shown in FIG. 11, a portion of the wiring pattern 25c and first light-reflecting layer 30 mentioned above are formed in layers on the insulating layer on the base member 25a. In FIG. 9, the portions on the mounting surface 25a1 of the LED substrate 25 where the second light-reflecting layer 31 is formed are depicted with shading, and regions that are not shaded (excluding the LED 24) are portions of the first light-reflecting layer 30 not covered by the second light-reflecting layer 31.

As shown in FIGS. 9 to 11, the first light-reflecting layer 30 is provided evenly over substantially the entire region of the mounting surface 25a1 of the LED substrate 25 excluding the mounting regions for the LEDs 24, the connectors 25d, and the like. Therefore, a portion of the first light-reflecting layer 30 is disposed around the LED 24, within the lens insertion hole 29d in a state in which the reflective sheet 29 has been disposed. The first light-reflecting layer 30, by covering the wiring patterns 25c as stated above, has the function of preventing oxidation of the wiring patterns 25c, shorting between wiring patterns 25c, and the like, and is a so-called solder resist. The first light-reflecting layer 30 that is a solder resist is made of a photocurable resin or a heat curable resin, and in the process of manufacturing the LED substrate 25, the first light-reflecting layer 30 is coated onto the mounting surface 25a1 of the LED substrate 25 as a liquid, and then, light of a certain wavelength (such as UV light, for example) is radiated or heat is applied thereon, thus curing the material. When coating the liquid-state first light-reflecting layer 30 onto the mounting surface 25a1 of the LED substrate 25, it is possible to use screen printing, spraying, curtain coating, electrostatic coating, or the like. The liquid material is coated and then cured, thus forming the first light-reflecting layer 30 that is a solder resist; it is difficult to control the final thickness thereof in a precise manner, and variation in thickness within a certain range is deemed inevitable.

Figure 12:
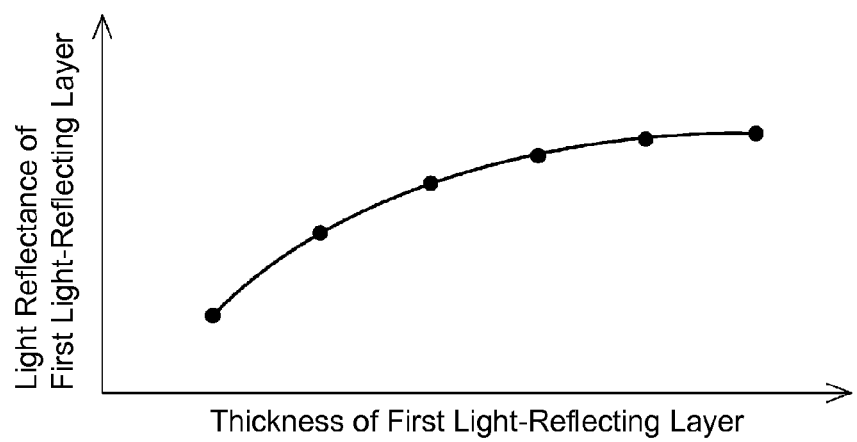
FIG. 12 is a graph showing the change in light reflectance in relation to the thickness of a first light-reflecting layer.

The first light-reflecting layer 30 has a surface color of white, for example, having excellent light-reflecting properties, and as a result, it is possible to efficiently reflect light from the LEDs 24 off of the mounting surface 25a1 of the LED substrate 25, and thereby increase the light usage rate. The first light-reflecting layer 30 can have varied light reflectance depending on the thickness thereof. Specifically, as shown in FIG. 12, the first light-reflecting layer 30 has a greater light reflectance the thicker it is, and a lower light reflectance the thinner it is. The horizontal axis of the graph shown in FIG. 12 represents the thickness of the first light-reflecting layer, and the vertical axis represents the light reflectance of the first light-reflecting layer 30; the leftmost end of the curve with respect to the horizontal axis is the minimum thickness of the first light-reflecting layer 30, and the rightmost end thereof is the maximum thickness of the first light-reflecting layer 30. According to research by the inventor of the present invention, the rate of change in the light reflectance with respect to the amount of change in thickness in the first light-reflecting layer 30, or in other words, the slope of the curve in the graph shown in FIG. 12 changes depending on the thickness (position on the horizontal axis); the slope of the curve becomes greater as the thickness becomes less and the above-mentioned rate of change becomes greater, whereas the slope of the curve becomes less as the thickness becomes greater and the above-mentioned rate of change becomes less. Thus, the inventor of the present invention found that when the first light-reflecting layer 30 is made thinner than a certain amount, then when variation occurs in the thickness thereof due to the above-mentioned manufacturing reasons, the resulting amount of change in light reflectance becomes greater, whereas if the thickness thereof is made greater than a certain amount, then even if variation in thickness occurs due to the manufacturing reasons, the amount of change in light reflectance is less. Thus, in the present embodiment, by setting the thickness of the first light-reflecting layer 30 to be greater than a certain amount, it is possible to minimize the variation in light reflectance resulting from variation in thickness, and thus, the first light-reflecting layer 30 is not susceptible to variation in light reflectance. The light reflectance of the first light-reflecting layer 30 at this time is substantially equal to the light reflectance of the reflective sheet 29.

However, if the thickness of the first light-reflecting layer 30 is set at greater than a certain amount as described above, then the light reflectance becomes excessively high, which runs the risk of causing uneven brightness. In other words, as shown in FIGS. 9 and 10, the first light-reflecting layer 30 is formed over substantially the entire mounting surface 25a1 of the LED substrate 25, but a large portion thereof is covered by the bottom section 29a of the reflective sheet 29, and thus, in reality, only the portion of the first light-reflecting layer 30 present in the lens insertion hole 29d (portion exposed through the lens insertion hole 29d) exhibits light-reflecting properties. The portion of the first light-reflecting layer 30 in the lens insertion hole 29d mainly reflects light, which was reflected from the diffusion lens 27, back to the diffusion lens 27, thus supplying light thereto, but this diffusion lens 27 has an ideal amount of light to be supplied thereto due to the design, and if an amount of light exceeding this ideal amount was supplied thereto, there was a problem of uneven brightness in the outputted light. Thus, if the light reflectance became high due to the thickness of the first light-reflecting layer 30 being greater than a certain amount, then the amount of light supplied to the diffusion lens 27 became excessive, and as a result, there was of uneven brightness.

In the present embodiment, as shown in FIGS. 9 and 10, the portion of the mounting surface 25a1 of the LED substrate 25 within the lens insertion hole 29d has second light-reflecting layer 31 having a light reflectance different from that of the first light-reflecting layer 30, the second light-reflecting layer 31 being disposed so as to cover portions of the first light-reflecting layer 30. The second light-reflecting layer 31, like the first light-reflecting layer 30, is made of a photocurable resin or a heat curable resin, and the surface thereof is white, for example, and has excellent light-reflecting properties. During the manufacturing process of the LED substrate 25, the second light-reflecting layer 31 is coated onto the mounting surface 25a1 of the LED substrate 25 as a liquid so as to cover the first light-reflecting layer 30, and then, light of a certain wavelength (such as UV light, for example) is radiated thereon, or heat is applied thereon to cure it. When coating the first light-reflecting layer 30 with the liquid second light-reflecting layer 31, screen printing can be used, for example.

The second light-reflecting layer 31 has a lower light reflectance than the first light-reflecting layer 30. Therefore, even if the light reflectance of the first light-reflecting layer 30 becomes too high as a result of the circumstances described above, by forming the second light-reflecting layer 31 with a lower light-reflectance over portions of the first light-reflecting layer 30, it is possible to lower the light reflectance over the entire mounting surface 25a1 of the LED substrate 25, and thus, it is possible to have an appropriate light reflectance for the mounting surface 25a1 and an appropriate amount of light supplied to the diffusion lenses 27. It is preferable that the light reflectance of the second light-reflecting layer 31 be even lower than the light reflectance of the first light-reflecting layer 30 when the thickness of the first light-reflecting layer 30 is at the minimum allowed by design.

Figure 13:
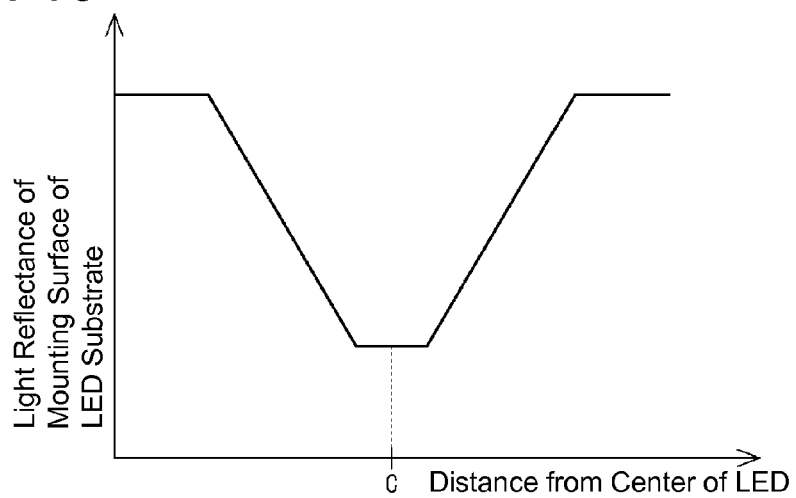
FIG. 13 is a graph showing the change in light reflectance in the mounting surface of the LED substrate in relation to the distance from the LED.

Under this condition, the second light-reflectance layer 31 is formed such that the further it is from the LED 24 on the mounting surface 25a1 of the LED substrate 25, the smaller it is in the proportion of area per unit area. Specifically, the second light-reflecting layer 31 is constituted of a plurality of dots 31a distributed over the mounting surface 25a1 (first light-reflecting layer 30) of the LED substrate 25, and the diameter of each of the dots 31a is smaller the further away it is from the LED 24. In this manner, the portion of the first light-reflecting layer 30, which has a higher light reflectance, that is not covered by the second light-reflecting layer 31 takes up a greater proportion of the area the further it is from the LED 24, and thus, as shown in FIG. 13, the light reflectance of the entire mounting surface 25a1 of the LED substrate 25 is higher, the further it is from the LED 24. Specifically, as shown in FIG. 9, the plurality of dots 31a constituting the second light-reflecting layer 31 each have a larger area the closer they are to the LED 24, whereas those that are further from a center C of the LED 24 in the radial direction have gradually smaller areas. As a result, as shown in FIG. 13, the overall light reflectance of the mounting surface 25a1 of the LED substrate 25 changes in a slope form in proportion to the distance from the center C of the LED 24. In FIG. 13, the region where the light reflectance changes in a slope form indicates the range within which the second light-reflecting layer 31 is formed, and the portions on the left and right ends of the curve where the light reflectance is flat indicate the light reflectance of only the first light-reflecting layer 30.

The LEDs 24 are point light sources, and light is emitted radially from the center thereof, and thus, the amount of light around each of the LEDs 24 becomes less the further it is from the LEDs 24, and becomes greater the closer it is to the LEDs 24. Therefore, in the configuration above, on the mounting surface 25a1 of the LED substrate 25, in areas that are relatively close to the LED 24 where the amount of light tends to be high, the proportion of area taken up by the second light-reflecting layer 31 becomes larger (while the proportion of area taken up by the first light-reflecting layer 30 becomes smaller) and the light reflectance becomes smaller, and thus, light reflection is lessened, whereas in areas further from the LED 24 where the amount of light tends to be low, the proportion of area taken up by the second light-reflecting layer 31 becomes smaller (while the area taken up by the first light-reflecting layer 30 becomes larger) and the light reflectance becomes larger, and thus, light reflection is promoted. As a result, the amount of light reflected is evened out for the mounting surface 25a1 of the LED substrate 25, and the amount of light supplied to the diffusion lens 27 also becomes even regardless of the distance from the LED 24.

As shown in FIG. 9, the dots 31a constituting the second light-reflecting layer 31 is disposed so as to surround the LED 24, and specifically, is disposed so as to form circles that are concentric with the center C of the LED 24. For dots 31a are at equal distance from the center C of the LED 24, or in other words, those that are aligned in the circumferential direction have equal area and are at equal distance from each other in the circumferential direction. For dots 31a having different distances in the radial direction from the LED 24, the areas thereof are different from each other as described above, but the distance between dots 31a adjacent to each other in the radial direction are equal. In other words, the dots 31a are disposed at equal pitch in the circumferential direction along a circle concentric with the center C of the LED 24, and are at equal pitch in the radial direction from the center C.

As shown in FIGS. 9 and 10, the dots 31a constituting the second light-reflecting layer 31 are disposed on the mounting surface 25a1 of the LED substrate 25 in an area corresponding in position to the diffusion lens 27 in a plan view, and in regions outside, or in other words, regions between the outer edge of the diffusion lens 27 and the edge of the lens insertion holes 29d. In other words, the dots 31a are formed over substantially all portions of the mounting surface 25a1 of the LED substrate 25 that are exposed at the front through the lens insertion hole 29d (region within the lens insertion hole 29d). Thus, even if light reflected by the diffusion lens 27 reaches areas of the mounting surface 25a1 of the LED substrate 25 outside of the diffusion lens 27 or if light other than that from the diffusion lens 27 is radiated onto the outside areas, it is possible to have the light be reflected by the second light-reflection layer 31, and thus, it is possible to further stabilize the amount of light entering the diffusion lens 27.

(Description of Operation and Effects of Main Part of the Present Embodiment)

The present embodiment has the above-mentioned structure, and the operation thereof will be explained next. When the power of the liquid crystal display device 10 is switched on, power is supplied to each of the LED substrates 25 from the LED driver circuit included in the backlight device 12, thus illuminating the LEDs 24, and the driving of the liquid crystal panel 11 is controlled by a display control circuit substrate that is not shown, thus allowing a prescribed image to be displayed on the display surface of the liquid crystal panel 11.

Specifically, as shown in FIG. 10, light emitted by the LEDs 24 first enters the light-receiving surfaces 27a of the diffusion lenses 27. At this time, most of the light enters the light-receiving surface 27a at the inclined surface of the light-receiving side concavity 27c, and thus, due to the angle of incline, the light enters the diffusion lens 27 while being refracted at a wide angle. After the light that has entered propagates through the diffusion lens 27, it exits from the light-exiting surface 27b, and this light-exiting surface 27b has a flat substantially spherical shape, and thus, the light exits while being refracted to an even wider angle at the outer boundary with the air layer. Furthermore, in regions of the light-exiting side surface 27b where the amount of light from the LED 24 is large, a substantially bowl-shaped light-exiting side concavity 27e is formed, and the area surrounding this has a flat substantially spherical shape, and thus, light around the light-exiting concavity 27e can exit while being refracted at a wide angle, or reflected towards the LED substrate 25. The light exiting the diffusion lens 27 is either directly radiated onto the optical members 23 or is reflected off of the reflective sheet 29 and indirectly radiated onto the optical members 23. The light radiated to the optical members 23 has prescribed optical effects (diffusing or condensing) applied thereon when passing through the optical members 23. The light passing through the optical members 23 is radiated onto the liquid crystal panel 11, and thus, a prescribed image is displayed on the display surface of the liquid crystal panel 11.

As shown in FIGS. 9 and 10, portions of the mounting surface 25a1 of the LED substrate 25 in the lens insertion hole 29d of the reflective sheet 29 have formed thereon the first light-reflecting layer 30 and the second reflecting layer 31 that has a lower light reflectance than the first light-reflecting layer 30 and that covers portions of the first reflecting layer 30, and thus, the overall light reflectance of the mounting surface 25a1 is stable regardless of variation in thickness that can occur in the first light-reflecting layer 30, and a situation in which light reflectance becomes excessively high is mitigated even if the thickness of the first light-reflecting layer 30 exceeds a certain amount. Thus, the amount of light reflected by the first light-reflecting layer 30 and the second light-reflecting layer 31 on the mounting surface 25a1 of the LED substrate 25 is stabilized at an appropriate level, and thus, the amount of light entering the diffusion lens 27 is also stabilized at an appropriate level, which stabilizes the amount of light exiting the diffusion lenses 27 and thus mitigates uneven brightness. Furthermore, the proportion of area taken up by the second light-reflecting layer 31 (diameter of the dots 31a) becomes smaller the further away from the LED 24 it is, and thus, the light reflectance of the mounting surface 25a1 of the LED substrate 25 becomes higher the further away from the LED 24 that it is, and therefore, excessive reflection near the LED 24 is mitigated and the amount of reflection far from the LED 24, where there tended to be not enough reflection, is sufficiently compensated. As a result, the amount of reflection on the mounting surface 25a1 of the LED substrate 25 is made even, and the amount of light entering the diffusion lens 27 is also evened out, which is more suitable for mitigating uneven brightness.

As described above, the backlight device (illumination device) 12 of the present embodiment includes: LEDs (light sources) 24; an LED substrate (light source substrate) 25 on which the LEDs 24 are mounted; a reflective sheet (reflective member) 29 that reflects light from the LEDs 24, that has lens insertion holes (light insertion holes) 29d through which the LEDs 24 are inserted, and that is disposed so as to cover a mounting surface 25a1 for the LEDs 24 on the LED substrate 25; a first light-reflecting layer 30 that is formed at least in portions of the mounting surface 25a1 of the LED substrate 25 within the lens insertion holes 29d, and that reflects light from the LEDs 24; and a second reflective layer 31 that is formed at least in portions of the mounting surface 25a1 of the LED substrate 25 within the lens insertion holes 29d, that has a light reflectance different from that of the first light-reflecting layer 30, and that is formed so as to cover portions of the first light-reflecting layer 30.

Light emitted by the LEDs 24 is reflected by the reflective sheet 29, or reflected by the first light-reflecting layer 30 formed in portions on the mounting surface 25a1 for the LEDs 24 on the LED substrate 25 within the lens insertion holes 29d, and the second light-reflecting layer 31 formed so as to cover portions of the first reflecting layer 30, and thus, this light can be used effectively as light emitted from the backlight device 12. In the first light-reflecting layer 30, the light reflectance changes depending on the thickness thereof, and there is a possibility of the thickness varying due to manufacturing reasons. As a countermeasure, the second light-reflecting layer 31 has a different light reflectance than the first light-reflecting layer 30 and is formed on portions of the first light-reflecting layer 30, and by appropriately setting where the second light-reflecting layer 31 is formed (where the first light-reflecting layer 30 is not covered by the second light-reflecting layer 31), the light reflectance of the second light-reflecting layer 31, and the like, then even if there is some variation in the thickness of the first light-reflecting layer 30 and the light reflectance thereof, it is possible to stabilize the light reflectance of the mounting surface 25a1 of the LED substrate 25. As a result, the amount of light reflected by the mounting surface 25a1 in the LED substrate 25 becomes stable, and uneven brightness in the light outputted by the backlight device 12 can be mitigated.

The second light-reflecting layer 31 has a lower light reflectance than the first light-reflecting layer 30. If increasing the thickness of the first light-reflecting layer 30 to a certain amount results in decreased variation in the light reflectance of the first light-reflecting layer 30, for example, then it is preferable that the thickness of the first light-reflecting layer 30 be set to such thickness and that variation in light reflectance in the first light-reflecting layer 30 be minimized. By setting the thickness of the first light-reflecting layer 30 to that certain amount, there is a risk that the light reflectance would become high, but according to the present embodiment, the second light reflecting layer 31, which has a lower light reflectance than the first light-reflecting layer 30, covers portions of the first light-reflecting layer 30, and thus, by setting the area where the second light-reflecting layer 31 is to be formed and the light reflectance thereof, it is possible to decrease the light reflectance of the mounting surface 25a1 of the LED substrate 25, where there was a tendency for the light reflectance to increase to excessive levels. As a result, it is possible to suitably mitigate uneven brightness.

The second light-reflectance layer 31 is formed such that the further it is from the LED 24 on the mounting surface 25a1 of the LED substrate 25, the smaller it is in proportion of area taken up among a unit area. In this manner, the portion of the first light-reflecting layer 30, which has a higher light reflectance than the second light-reflecting layer 31, that is not covered by the second light-reflecting layer 31 takes up a greater proportion of the area the further it is from the LED 24, and thus, the light reflectance of the mounting surface 25a1 of the LED substrate 25 is higher, the further it is from the LED 24. In positions on the mounting surface 25a1 of the LED substrate 25 that are relatively close to the LED 24, the amount of light is large, but according to the above-mentioned configuration, the light reflectance is made low, which decreases the amount of light reflected in this area, which would otherwise have a tendency to exhibit excessive light reflection. On the other hand, in positions on the mounting surface 25a1 of the LED substrate 25 that are relatively far from the LED 24, the amount of light is less, but the amount of light reflectance can be made high by the above-mentioned configuration in this area where the amount of light would otherwise tend to be insufficient. In this manner, the amount of light reflected by the mounting surface 25a1 of the LED substrate 25 is evened out, and thus, it is possible to further mitigate uneven brightness in a suitable manner. Furthermore, compared to a case in which the thickness and material of the second light-reflecting layer 31 were changed based on the distance thereof from the LED 24, it is possible to form the second light-reflecting layer 31 with ease, thus decreasing the manufacturing cost.

The second light-reflecting layer 31 includes a plurality of dots 31a distributed on the mounting surface 25a1 of the LED substrate 25, and the diameter of each of the dots 31a becomes smaller the further it is from the LED 24. In this manner, by having the second light-reflecting layer 31 include a plurality of dots 31a and having the diameter of the dots 31a vary depending on the distance thereof from the LED 24, the light reflectance on the mounting surface 25a1 of the LED substrate 25 can be smoothly varied, which allows the amount of light reflected by the mounting surface 25a1 of the LED substrate 25 to be made more even.

The LEDs 24 are point light sources on the mounting surface 25a1 of the LED substrates 25, while the second light-reflecting layer 31 surrounds the LEDs 24 that are point light sources in a plan view. In this manner, light emitted from the LEDs 24 that are point light sources has a tendency to spread in the radial direction from the LEDs 24, which are point light sources in a plan view, and by reflecting this light off of the second light-reflecting layer 31 that surrounds the LEDs 24 and the portions of the first light-reflecting layer 30 that are not covered by the second light-reflecting layer 31, this reflected light is not susceptible to having a specific directivity in the circumferential direction. As a result, unevenness in the light reflected by the mounting surface 25a1 of the LED substrate 25 can be further mitigated.

The second light-reflecting layer 31 includes a plurality of dots 31a distributed on the mounting surface 25a1 of the LED substrate 25, and the dots 31a are aligned along the circumferential direction around each LED 24 that is a point light source, and dots 31a that are adjacent to each other in the circumferential direction have substantially equal areas and gaps therebetween. In this manner, light spreading in the radial direction from the LED 24 that is a point light source is reflected by the second light-reflecting layer 31 including the dots 31a that are substantially equal in area and that have an equal gap therebetween in the same circumferential row, and by portions of the first light-reflecting layer 30 not covered by the second light-reflecting layer 31, and thus, the reflected light is further prevented from having a specific directivity in the circumferential direction. In this manner, unevenness in the light reflected by the mounting surface 25a1 of the LED substrate 25 can be further mitigated.

The LED substrate 25 is provided with diffusion lenses (optical lenses) 27 that are disposed so as to face the LEDs 24 and that apply optical effects to light and output this light, which has entered from the LEDs 24, whereas the lens insertion hole 29d formed in the reflective sheet 29 has a size that allows the insertion of the LED 24 and the diffusion lens 27, and thus, the second light-reflecting layer 31 is formed at least in portions corresponding in position to the diffusion lenses 27 in a plan view. In this manner, light emitted by the LEDs 24 enters the diffusion lenses 27 and has prescribed optical effects applied thereby, after which this light is outputted by the diffusion lenses 27. Light from the LEDs 24 does not necessarily all enter the diffusion lens 27 and exit as is, and some of the light is reflected by the diffusion lens 27 towards the LED substrate 25. Such light reflected by the diffusion lens 27 is reflected back by the first light-reflecting layer 30 and the second light-reflecting layer 31 formed on the mounting surface 25a1 of the LED substrate 25, allowing this light to reenter the diffusion lens 27. Therefore, the amount of light reflected off of the mounting surface 25a1 of the LED substrate 25 by the second light-reflecting layer 31 is stabilized, and thus, the amount of light entering the diffusion lens 27 is also stabilized, thus making this configuration more suitable to mitigating uneven brightness.

The second light-reflecting layer 31 is formed over a wider area than the diffusion lens 27 in a plan view. The light reflected by the diffusion lens 27 is sometimes radiated onto the mounting surface 25a1 of the LED substrate 25 across a wider area thereof than the diffusion lens 27 in a plan view, but even in such a case, with the configuration above, it is possible to reflect this reflected light back towards the diffusion lens 27 by the second light-reflecting layer 31, and thus, it is possible to further stabilize the amount of light entering the diffusion lens 27.

The second light-reflecting layer 31 is formed such that the light reflectance of the mounting surface 25a1 of the LED substrate 25 is greater, the further it is from the LED 24. In this manner, in areas on the mounting surface 25a1 of the LED substrate 25 closer to the LEDs 24, the amount of light increases, but the light reflectance is lower, which decreases the amount of light reflected in this area, which would otherwise have a tendency to be excessive. On the other hand, in areas on the mounting surface 25a1 of the LED substrate 25 further from the LEDs 24, the amount of light is less, but the light reflectance is higher, which sufficiently supplements the amount of light reflected, which would otherwise have a tendency to be insufficient. As a result, the amount of light reflected by the mounting surface 25a1 of the LED substrate 25 is evened out, which allows uneven brightness to be mitigated in a more suitable manner.

Also, the second light-reflecting layer 31 includes a plurality of dots 31a distributed across the mounting surface 25a1 of the LED substrate 25. In this manner, by having the second light-reflecting layer 31 include a plurality of dots 31a, the area of formation for the second light-reflecting layer 31 (area of the first light-reflecting layer 30 not covered by the second light-reflecting layer 31) can be adjusted minutely based on the nature of the dot 31a pattern (number, area, etc.), thereby making this configuration more useful in making the brightness even.

The mounting surface 25a1 of the LED substrate 25 has formed thereon wiring patterns (wiring members) 25c connected to the LEDs 24, and the first light-reflecting layer 30 is made of solder resist that covers the wiring patterns 25c. In this manner, it is possible to protect the wiring patterns 25c and the like by the solder resist. The first light-reflecting layer 30 is made of the solder resist, and thus, it is possible to have a simpler structure at a less expensive manufacturing cost compared to a case in which the first light-reflecting layer is made separately from the solder resist.

The solder resist that constitutes the first light-reflecting layer 30 is coated as a liquid onto the mounting surface 25a1 of the LED substrate 25, and this liquid is then cured, thus forming the solder resist. When the solder resist formed in this manner, it is difficult to control the thickness of the solder resist, which was formed by curing the liquid, due to manufacturing reasons, but the second light-reflecting layer 31 described above allows the light reflectance on the mounting surface 25a1 of the LED substrate 25 to be stabilized, thus allowing uneven brightness to be mitigated.

Embodiment 1 of the present invention has been described above, but the present invention is not limited to the embodiment above, and may include modification examples below, for example. In the modification examples below, components similar to those in the embodiment above are given the same reference characters, and descriptions and depictions thereof may be omitted.

Modification Example 1 of Embodiment 1

Modification Example 1 of Embodiment 1 will be described with reference to FIG. 14. Here, a case in which the distribution of the second light-reflecting layer 31 is modified is shown.

Figure 14:
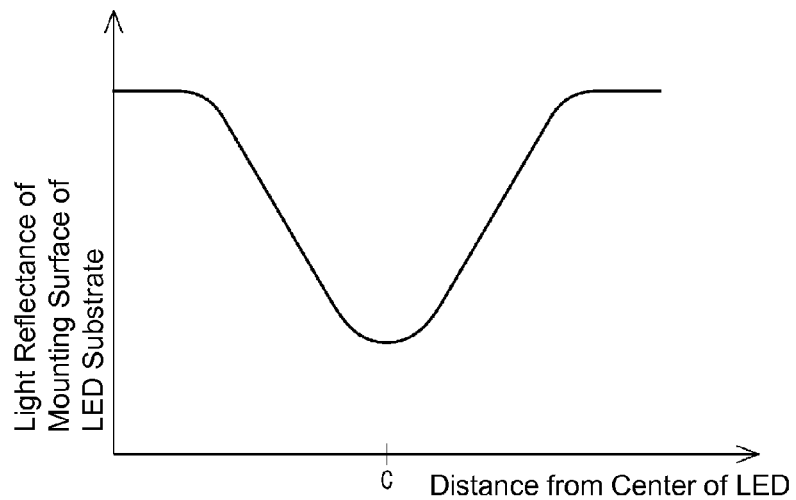
FIG. 14 is a graph showing the change in light reflectance in the mounting surface of the LED substrate in relation to the distance from the LED in Modification Example 1 of Embodiment 1.

As shown in FIG. 14, the proportion of area taken up by the second light-reflecting layer 31 of the present modification example on the mounting surface 25a1 of the LED substrate 25 changes along a smooth curve based on the distance thereof from the LED 24, and as a result, the light reflectance of the mounting surface 25a1 of the LED substrate 25 also changes along a smooth curve based on the distance from the LED 24.

Modification Example 2 of Embodiment 1

Modification Example 2 of Embodiment 1 will be described with reference to FIG. 15. Here, a case in which the distribution of the second light-reflecting layer 31 is modified is shown.

Figure 15:
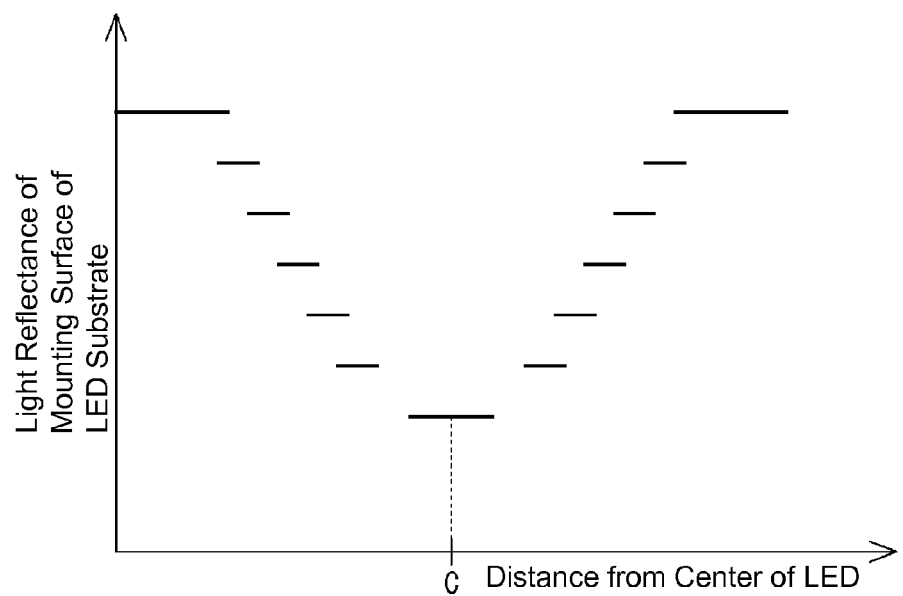
FIG. 15 is a graph showing the change in light reflectance in the mounting surface of the LED substrate in relation to the distance from the LED in Modification Example 2 of Embodiment 1.

As shown in FIG. 15, the proportion of area taken up by the second light-reflecting layer 31 according to the present modification example on the mounting surface 25a1 of the LED substrate 25 changes along a stripe-shaped curve based on the distance from the LED 24, and as a result, the light reflectance of the mounting surface 25a1 of the LED substrate 25 also changes along a striped-shaped curve based on the distance from the LED 24. In other words, the proportion of area taken up by the second light-reflecting layer 31 becomes lower in steps the further away from the LED 24 that it is in the radial direction with the LED 24 being the center, and as a result, the light reflectance also becomes higher in steps on the mounting surface 25a1.

Embodiment 2

Embodiment 2 of the present invention will be described with reference to FIG. 16. In Embodiment 2, the distribution of dots 131a constituting a second light-reflecting layer 131 is modified. Descriptions of structures, operations, and effects similar to those of Embodiment 1 will be omitted.

Figure 16:
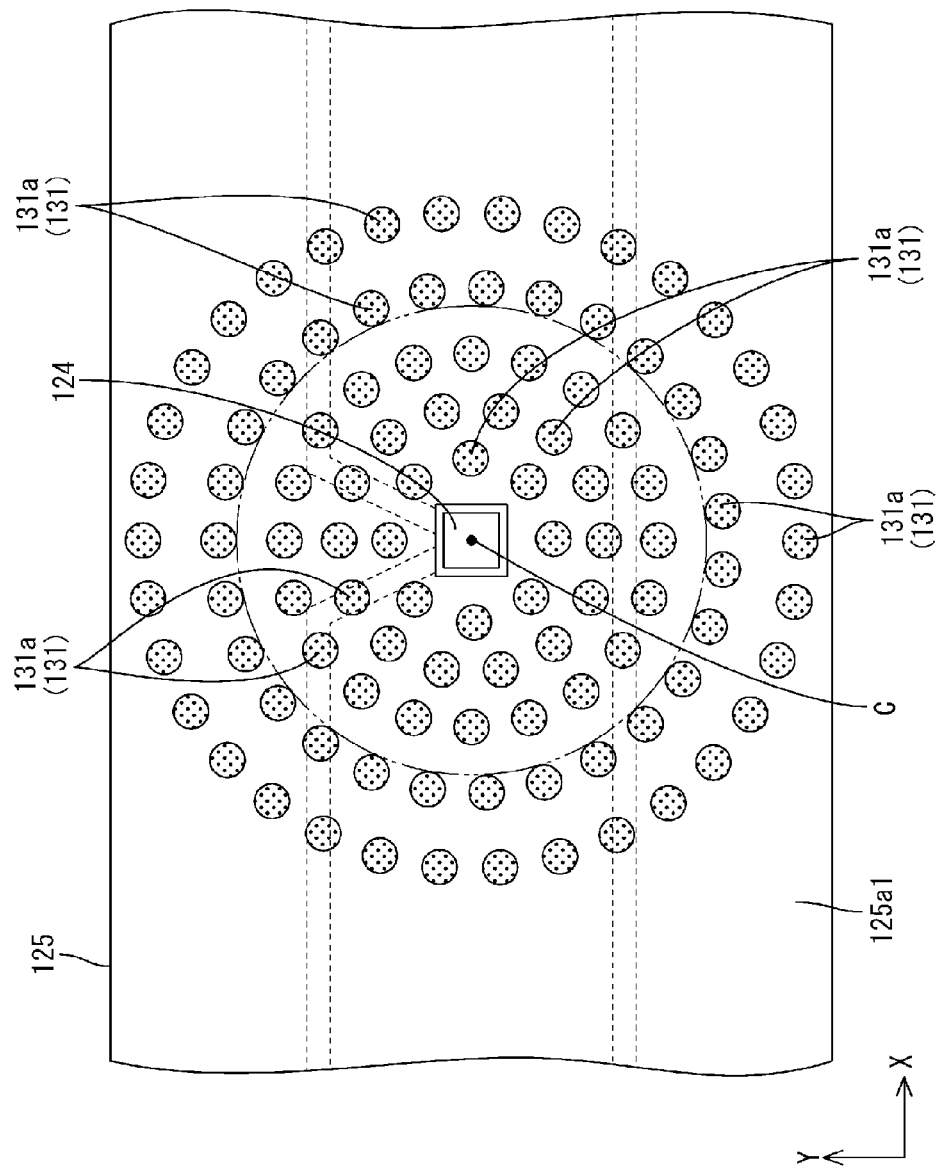
FIG. 16 is a magnified plan view of a vicinity of an LED on an LED substrate of Embodiment 2 of the present invention.

As shown in FIG. 16, the plurality of dots 131a constituting the second light-reflecting layer 131 of the present embodiment all have substantially equal diameters, and the gaps therebetween in the circumferential direction along a circle that is concentric with a center C of an LED 124 is substantially equal. However, the dots 131a are distributed such that the gap between the dots 131a in the radial direction from the center C of the LED 124 changes depending on the distance from the LED 124. That is, the gaps between dots 131a adjacent to each other in the radial direction from the center C of the LED 124 become larger, the further they are from the LED 124. Specifically, the dots 131a are formed in a pattern in which the gaps therebetween in the radial direction become gradually larger, the greater the distance from the LEDs 124 is. Therefore, among the dots 131a, the gap between the closest dots and the second closest dots to the LEDs 124 is the smallest gap, and the gap between the furthest dots and the second furthest dots from the LEDs 124 is the largest gap. Even if the dots 131a are distributed in this manner, the distribution of light reflectance in the mounting surface 125a1 of the LED substrate 125 can be made similar to that of Embodiment 1 (refer to FIG. 13).

As described above, in the present embodiment, the second light-reflecting layer 131 includes a plurality of dots 131a distributed on the mounting surface 125a1 of the LED substrate 125, and gaps between adjacent dots 131a become greater the further they are from the LEDs 124. By having the second light-reflecting layer 131 include a plurality of dots 131a and by having the gaps between the dots 131a vary according to the distance from the LED 124, the light reflectance in the mounting surface 125a1 of the LED substrate 125 can be made to change in a smooth manner, and the amount of light reflected by the mounting surface 125a1 of the LED substrate 125 can be made more even.

Embodiment 3

Embodiment 3 of the present invention will be described with reference to FIG. 17. In Embodiment 3, the distribution of dots 231a constituting second light-reflecting layer 231 is modified. Descriptions of structures, operations, and effects similar to those of Embodiment 1 will be omitted.

Figure 17:
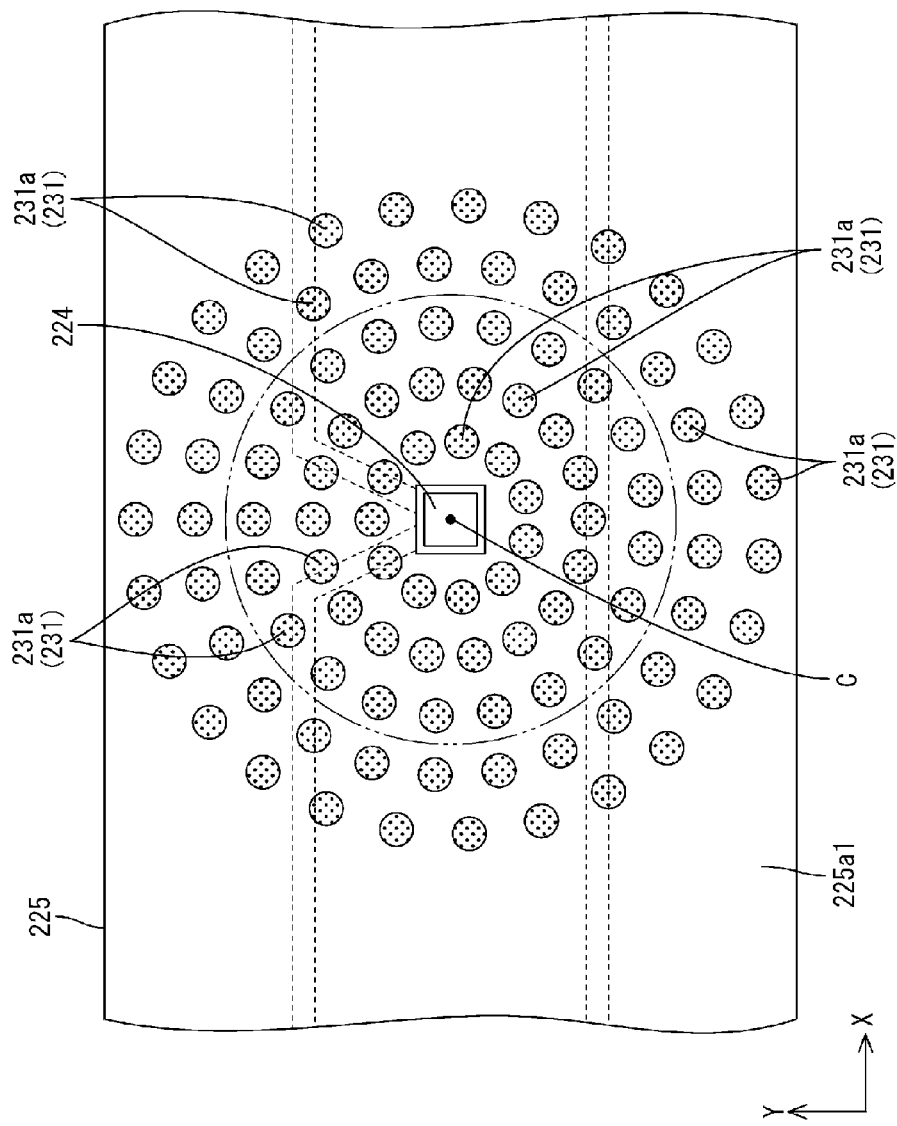
FIG. 17 is a magnified plan view of a vicinity of an LED on an LED substrate of Embodiment 3 of the present invention.

As shown in FIG. 17, the plurality of dots 231a included in the second light-reflecting layer 231 of the present embodiment all have substantially equal diameters, and the gaps therebetween in the radial direction from a center C of an LED 224 are substantially equal, but the gaps therebetween in the circumferential directions along circles concentric with a center C of the LED 224 vary depending on the distance from the LED 224. That is, the gaps between dots 231a adjacent to each other in the circumferential direction on circles concentric with the center C of the LED 224 become larger, the further they are from the LED 224. Specifically, the dots 231a are formed in a pattern in which the gaps therebetween in the circumferential direction become gradually larger, the greater the distance from the LEDs 224 is. Therefore, among the dots 231a, the gaps among the closest dots to the LEDs 224 are the smallest gaps, and the gap among the furthest dots from the LEDs 224 are the largest gaps. Even if the dots 231a are distributed in this manner, the distribution of light reflectance in the mounting surface 225a1 of the LED substrate 225 can be made similar to that of Embodiment 1 (refer to FIG. 13).

Embodiment 4

Embodiment 4 of the present invention will be described with reference to FIG. 18. In Embodiment 4, the area where a second light-reflecting layer 331 are formed, and the width of an LED substrate 325 are modified. Descriptions of structures, operations, and effects similar to those of Embodiment 1 will be omitted.

Figure 18:
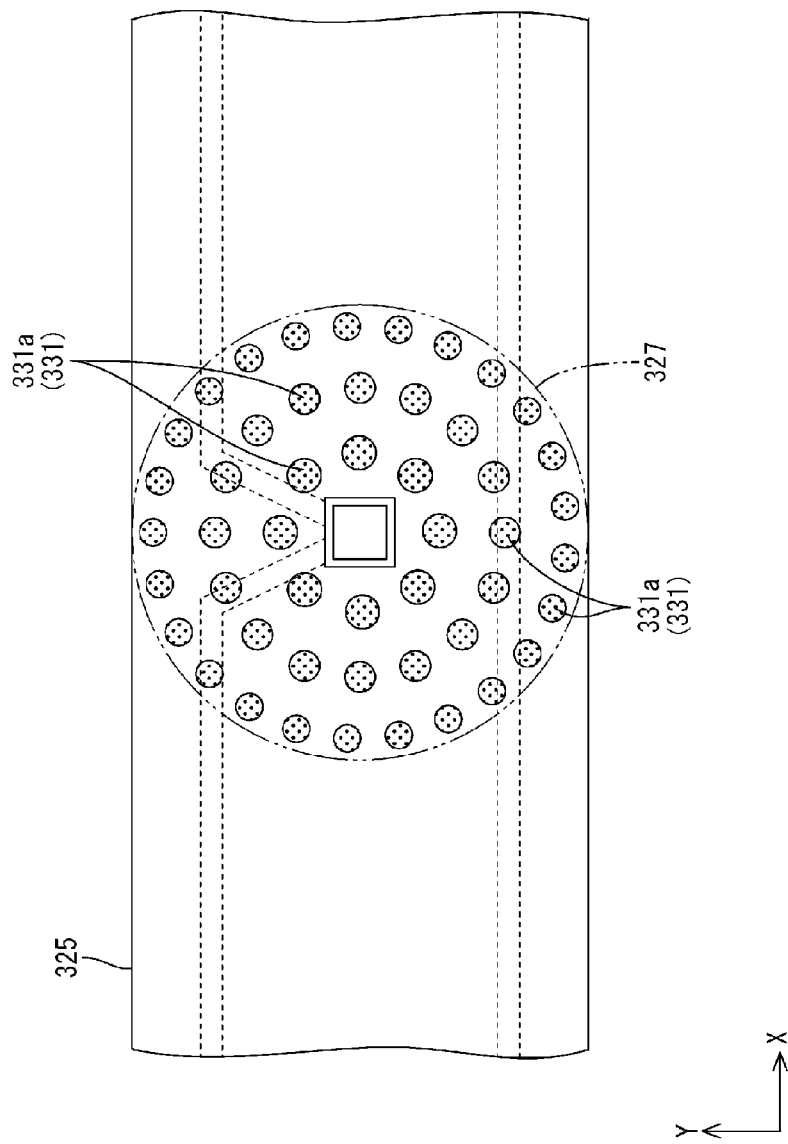
FIG. 18 is a magnified plan view of a vicinity of an LED on an LED substrate of Embodiment 4 of the present invention.

As shown in FIG. 18, the second light-reflecting layer 331 of the present embodiment substantially corresponds in position to where a diffusion lens 327 is formed. In other words, dots 331a constituting the second light-reflecting layer 331 are disposed over substantially the entire area corresponding in position to the diffusion lens 327 in a plan view, but are not disposed outside of the area of the diffusion lens 327, which is a difference from Embodiment 1. The LED substrate 325 of the present embodiment generally has the same width as the outer diameter of the diffusion lens 327.

Embodiment 5

Embodiment 5 of the present invention will be described with reference to FIG. 19. In Embodiment 5, the area where second light-reflecting layer 431 is formed, and the width of an LED substrate 425 are modified. Descriptions of structures, operations, and effects similar to those of Embodiment 1 will be omitted.

Figure 19:
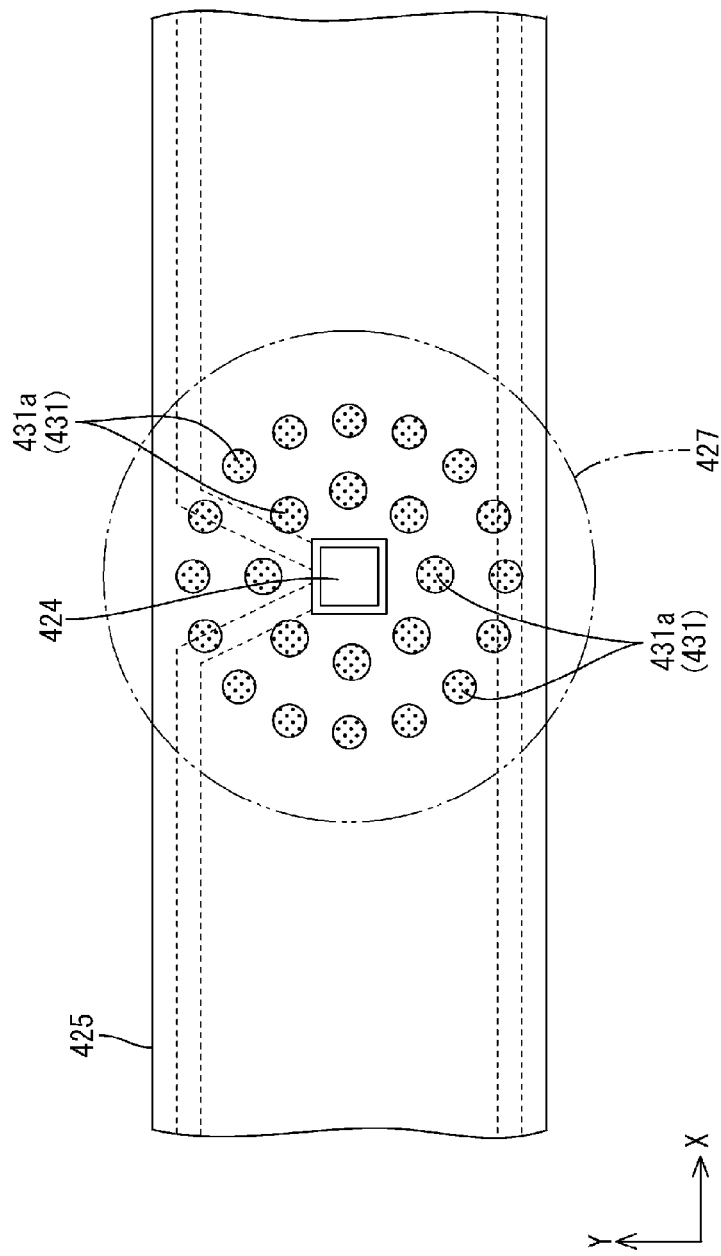
FIG. 19 is a magnified plan view of a vicinity of an LED on an LED substrate of Embodiment 5 of the present invention.

As shown in FIG. 19, the second light-reflecting layer 431 of the present embodiment is formed over an area narrower than the area where a diffusion lens 427 is formed. In other words, dots 431a constituting the second light-reflecting layer 431 are disposed only over a portion of the region corresponding in position to the diffusion lens 427 in a plan view, which is a difference from Embodiment 1. The dots 431a are disposed only in portions of the area corresponding in position to the diffusion lens 427 in a plan view that are close to the LED 424 (inner circumference area) and are not disposed in portions far from the LED 424 (outer circumference area). The LED substrate 425 of the present embodiment has a smaller width than the outer diameter of the diffusion lens 427.

Embodiment 6

Embodiment 6 of the present invention will be described with reference to FIG. 20. In Embodiment 6, the distribution of dots 531a constituting a second light-reflecting layer 531 are modified, and the material or thickness thereof is modified. Descriptions of structures, operations, and effects similar to those of Embodiment 1 will be omitted.

Figure 20:
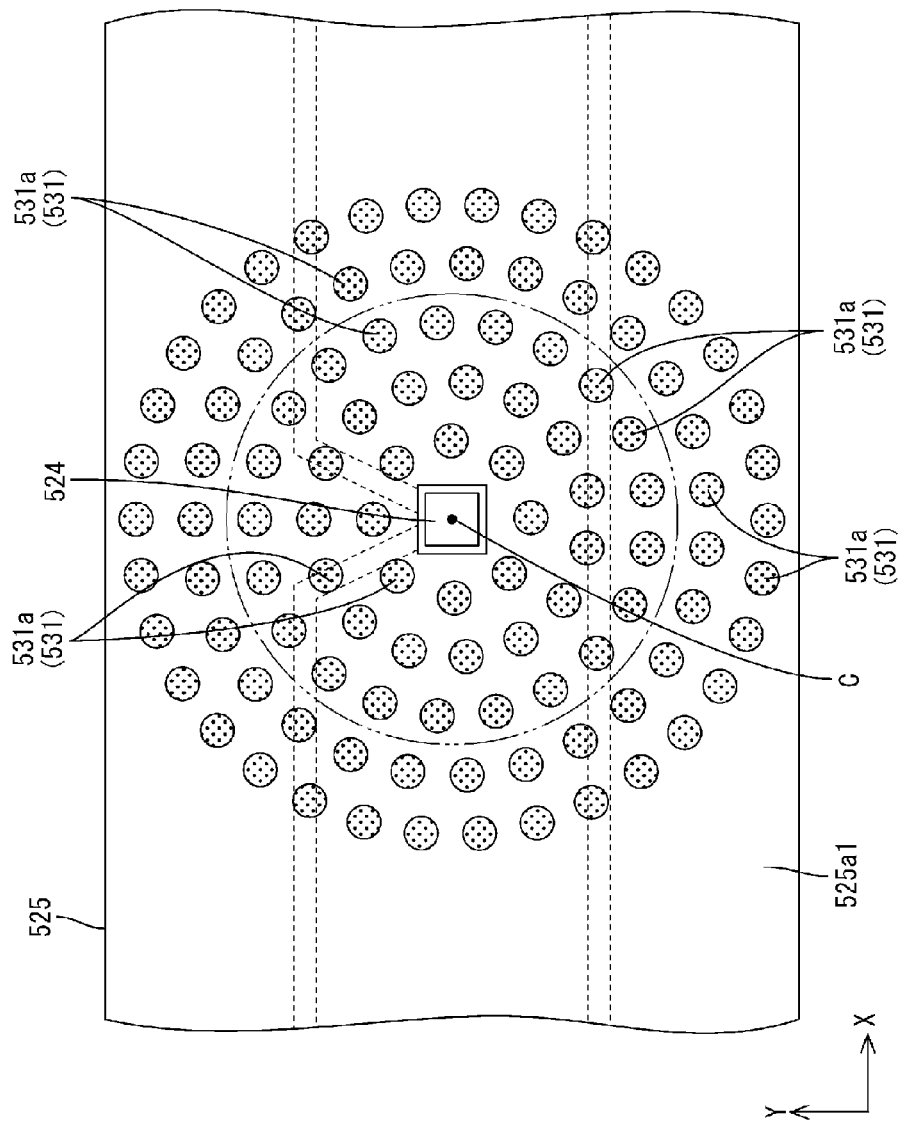
FIG. 20 is a magnified plan view of a vicinity of an LED on an LED substrate of Embodiment 6 of the present invention.

As shown in FIG. 20, the plurality of dots 531a constituting the second light-reflecting layer 531 of the present embodiment all have substantially the same diameter, have substantially equal gaps in the radial direction from a center C of the LED 524, and have substantially equal gaps in the circumferential direction along circles that are concentric with the center C of the LED 524. In other words, the proportion of area taken up by the dots 531a per unit area on a mounting surface 525a1 of an LED substrate 525 is such that the distribution of dots 531a is even regardless of distance from the LED 525. On the other hand, the second light-reflecting layer 531 is configured such that the respective dots 531a thereof vary in thickness depending on the distance from the LED 524, and specifically, become thinner the further they are from the LED 524. Specifically, the dots 531a are formed in a pattern in which the thickness thereof becomes gradually smaller, the greater the distance from the LEDs 524 is. Therefore, the dots 531a closest to the LED 524 are the thickest and those furthest from the LED 524 are the thinnest. Even if the dots 531a are distributed in this manner, the distribution of light reflectance in the mounting surface 525a1 of the LED substrate 525 can be made similar to that of Embodiment 1 (refer to FIG. 13).

Embodiment 7

Embodiment 7 of the present invention will be described with reference to FIG. 21. In Embodiment 7, the light reflectance of a first light-reflecting layer 630 and second light-reflecting layer 631 are modified. Descriptions of structures, operations, and effects similar to those of Embodiment 1 will be omitted.

Figure 21:
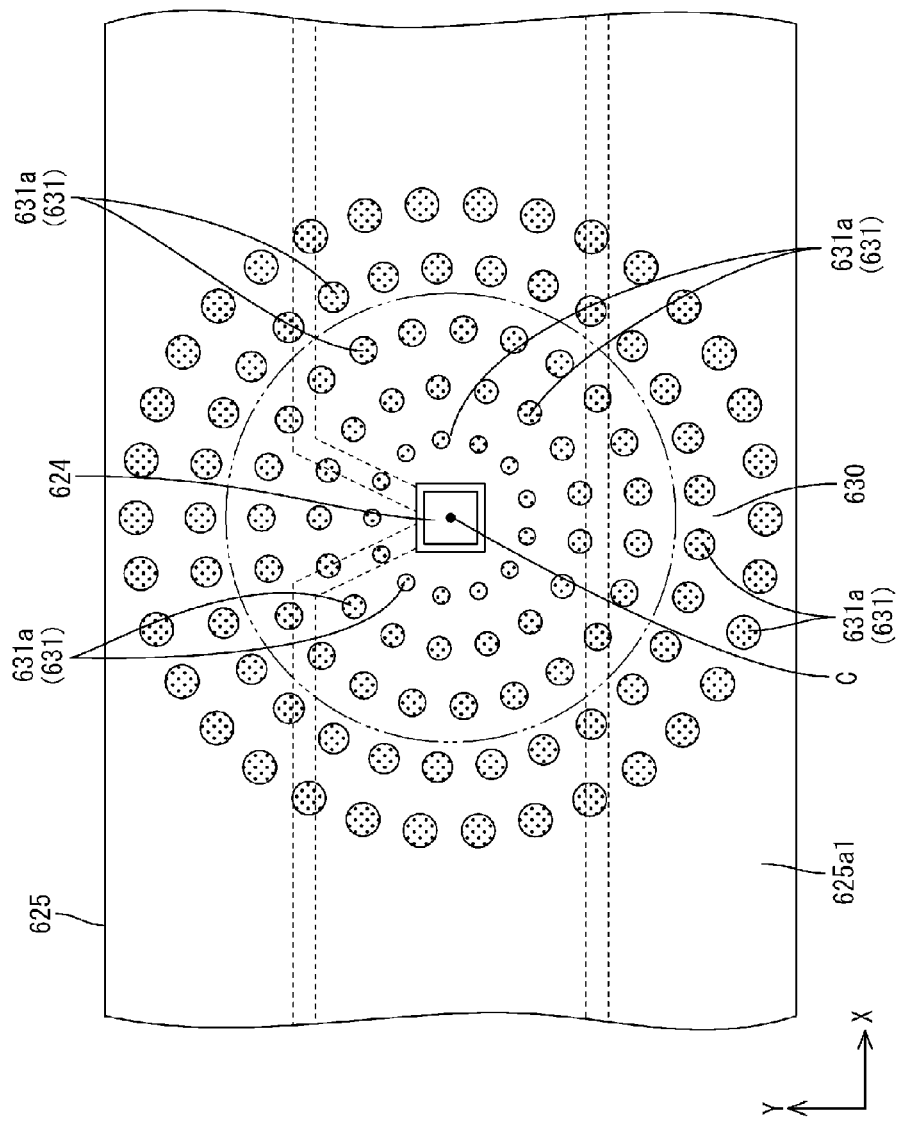
FIG. 21 is a magnified plan view of a vicinity of an LED on an LED substrate of Embodiment 7 of the present invention.

As shown in FIG. 21, the second light-reflecting layer 631 of the present embodiment has a higher light reflectance than the first light-reflecting layer 630. Specifically, the second light-reflecting layer 631 is formed such that the proportion of area taken up per unit area on a mounting surface 625a1 of an LED substrate 625 becomes greater, the further it is from the LED 624. Specifically, a plurality of dots 631a constituting the second light-reflecting layer 631 have larger diameters, the further they are from the LED 624. In this manner, the proportion of area taken up by portions of the first light-reflecting layer 630, which has a relatively high light-reflectance, not covered by the second light-reflecting layer 631 is reduced the further away from the LED 624 that it is, and thus, the light reflectance of the entire mounting surface 625a1 of the LED substrate 625 is greater the further away from the LED 624 that it is, similar to Embodiment 1 (refer to FIG. 13). Specifically, among the plurality of dots 631a constituting the second light-reflecting layer 631, those closest to the LED 624 have the smallest area and the area of the dots becomes gradually larger the further away from a center C of the LED 624 they are in the radial direction. Such a configuration is useful a case such as if a situation occurs in which the first light-reflecting layer 630 must be made thinner than a certain amount, or if a material that reduces the variation in light reflectance in the first light-reflecting layer 630 is used when the thickness of the first light-reflecting layer 630 is made smaller than a certain amount.

Embodiment 8

Embodiment 8 of the present invention will be described with reference to FIG. 22. In Embodiment 8, the form of the second light-reflecting layer 731 is modified. Descriptions of structures, operations, and effects similar to those of Embodiment 1 will be omitted.

Figure 22:
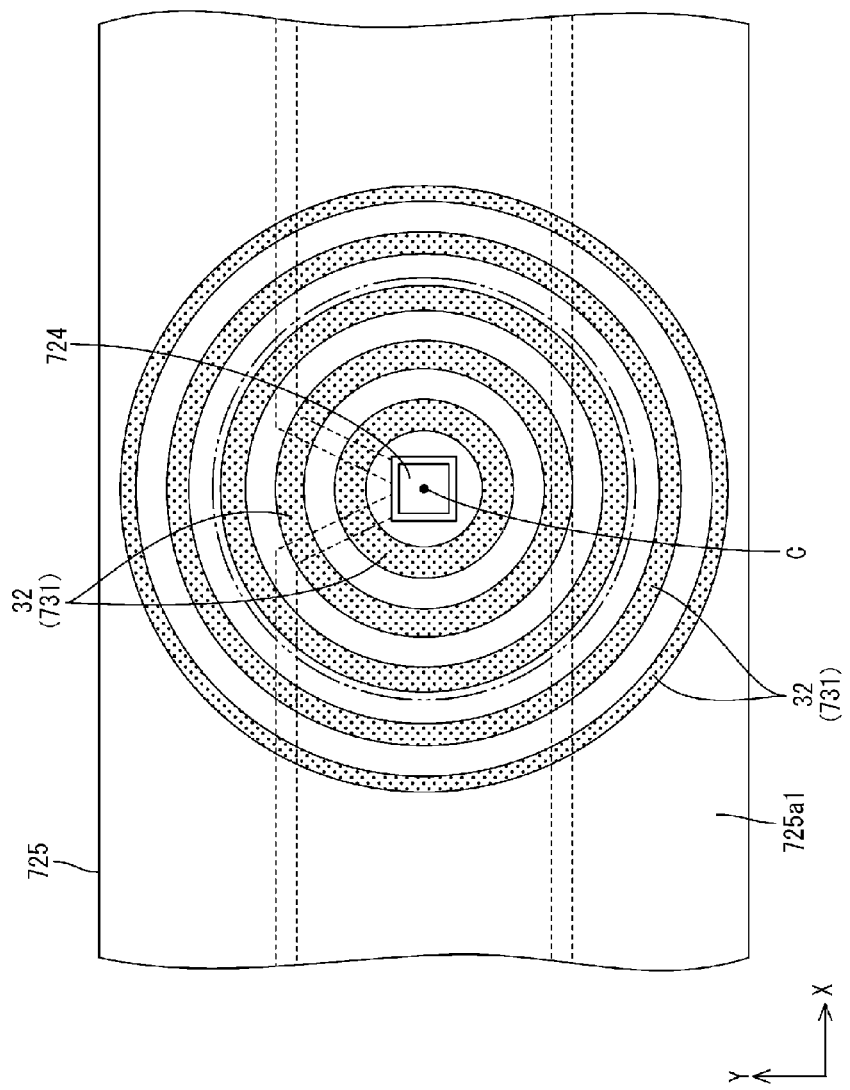
FIG. 22 is a magnified plan view of a vicinity of an LED on an LED substrate of Embodiment 8 of the present invention.

As shown in FIG. 22, the second light-reflecting layer 731 of the present embodiment is constituted of a plurality of ring-shaped patterns 32 extending along circumferential directions of circles that are concentric with a center C of an LED 724. The ring-shaped patterns 32 constituting the second light-reflecting layer 731 are respectively formed into donut shapes that are concentric with the center C of the LED 724 and have the same width throughout each of the circles. The ring-shaped patterns 32 are formed so as to be narrower the further they are from the LED 724. Thus, among the ring-shaped patterns 32, the closest one to the LED 724 is the widest, and the furthest one from the LED 724 is the most narrow. Even if the second light-reflecting layer 731 includes donut-shaped ring-shaped patterns 32 instead of dots, the distribution of light reflectance on the mounting surface 725a1 of the LED substrate 725 can be made similar to that of Embodiment 1 (refer to FIG. 13).

Embodiment 9

Embodiment 9 of the present invention will be described with reference to FIG. 24. In Embodiment 9, the form of second light-reflecting layer 831 is modified. Descriptions of structures, operations, and effects similar to those of Embodiment 1 will be omitted.

Figure 23:
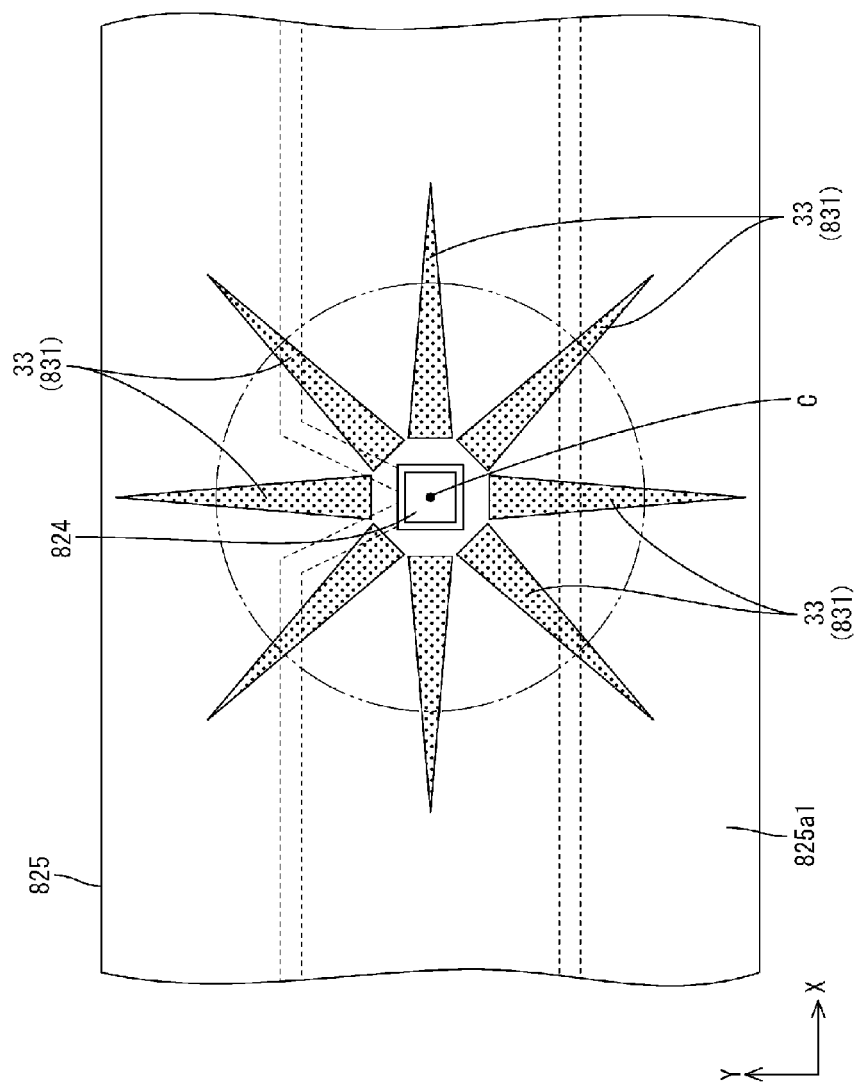
FIG. 23 is a magnified plan view of a vicinity of an LED on an LED substrate of Embodiment 9 of the present invention.

As shown in FIG. 23, the second light-reflecting layer 831 of the present embodiment is constituted of a plurality of line-shaped patterns 33 that extend along the radial direction from a center C of an LED 824. The line-shaped patterns 33 constituting the second light-reflecting layer 831 each form an isosceles triangle with the base side facing the LED 824. Each line-shaped pattern 33 is formed so as to become narrower the further it is from the LED 824. Therefore, the portion of each of the line-shaped patterns 33 that is closest to the LED 824 is the widest, and the portion thereof that is furthest from the LED 824 is the most narrow. Even if the second light-reflecting layer 831 includes line-shaped patterns 33 instead of dots, the distribution of light reflectance on the mounting surface 825a1 of the LED substrate 825 can be made similar to that of Embodiment 1 (refer to FIG. 13).

Other Embodiments

The present invention is not limited to the embodiments shown in the drawings and described above, and the following embodiments are also included in the technical scope of the present invention, for example.

(1) In Embodiment 1, the area of the dots constituting the second light-reflecting layer was varied depending on the distance from the LED, in Embodiment 2, the gap between the dots in the radial direction was varied depending on the distance from the LED, and in Embodiment 3, the gap between the dots in the circumferential direction was varied depending on the distance from the LED, but two or three of these techniques can be freely combined. In other words, the area and gap in the radial direction of the dots constituting the second light-reflecting layer may be varied depending on the distance from the LED; the area and gap in the circumferential direction of the dots may be varied depending on the distance from the LED; or the area, gap in the radial direction, and the gap in the circumferential direction of the dots may be varied depending on the distance from the LED.

(2) It is possible to apply to (1) the technique disclosed in Embodiment 6, or in other words, a technique in which the thickness of the dots constituting the second light-reflecting layer varies depending on the distance from the LED.

(3) As a modification example of Embodiment 6, a configuration may be used in which the material used in the dots constituting the second light-reflecting layer, for example, is varied depending on the distance from the LED such that a material with high light reflectance is used for dots closer to the LED and a material with low light reflectance is used for dots further from the LED.

(4) As another modification example of Embodiment 6 above, a configuration may be used in which the same material is used for all dots constituting the second light-reflecting layer, for example, but the concentration of this material is varied depending on the distance from the LED, such that a material with high concentration is used for dots closer to the LED, but a material with low concentration is used for dots further from the LED.

(5) It is apparent that it is possible to apply the techniques disclosed in (3) and (4) to (1).

(6) It is apparent that it is possible to apply the techniques disclosed in Embodiments 2 to 7 to Embodiments 8 and 9.

(7) It is apparent that it is possible to apply the techniques disclosed in Modification Examples 1 and 2 of Embodiment 1 to Embodiments 2 to 9.

(8) In Embodiments 1 to 7, examples were shown in which the dots constituting the second light-reflecting layer are circular, but besides this, the dots may be ellipses, or polygons such as diamonds, triangles, or quadrilaterals, for example.

(9) In the embodiments above, the second light-reflecting layer was formed by screen printing, but it is also possible to form the second light-reflecting layer by inkjet printing using an inkjet device, for example.

(10) In the embodiments above, examples were shown in which the surfaces of the first light-reflecting layer and the second reflecting layers were white, but the color of the surfaces may be milky white or silver, for example.

(11) In the embodiments above, the first light-reflecting layer is formed by coating it onto the mounting surface of the LED substrate and curing it, but forming the first light-reflecting layer by adhering a film-type material onto the mounting surface of the LED substrate is also included in the present invention.

(12) In the embodiments above, the first light-reflecting layer is a solder resist that covers substantially the entire mounting surface of the LED substrate, but the first light-reflecting layer may be formed separately from the solder resist. In such a case, the first light-reflecting layer can be formed only in portions of the mounting surface of the LED substrate in the lens insertion hole of the reflective sheet. However, even in such a case, it is preferable that the first light-reflecting layer be formed to be slightly larger than the lens insertion hole, taking into account the margin of error during attachment.

(13) In the embodiments above, examples were shown in which LEDs were used as the point light source, but it is apparent that other types of point light sources besides LEDs can be used.

(14) In the embodiments above, a diffusion lens that diffuses light from the LED is used as the optical lens, but a configuration that uses an optical lens other than a diffusion lens (such as a condensing lens that condenses light, for example) is also included in the present invention.

(15) In the embodiments above, a diffusion lens is used, but the present invention can be applied to a configuration that lacks a diffusion lenses. In such a case, the reflective sheet simply needs to have formed therein LED insertion holes large enough to be able to insert LEDs, and the first light-reflecting layer and the second light-reflecting layer simply need to be formed at least in portions of the mounting surface of the LED substrate in the LED insertion holes.

(16) In the embodiments above, the base member of the LED substrate is made of metal, but the base member of the LED substrate can be made of an insulating material such as a ceramic.

(17) In the embodiments above, the number and position of LED substrates, the number and position of LEDs mounted on each LED substrate, and the like can be appropriately modified.

(18) Besides the configuration of Embodiment 1, the position of the respective colored portions constituting the color filters in the liquid crystal panel, the size relations therebetween, and the like can be appropriately modified.

(19) Besides the configuration of Embodiment 1, as colored portions constituting the color filters in the liquid crystal panel, cyan (C) may be used in addition to red (R), green (G), and blue (B).

(20) Besides the configuration of Embodiment 1, a configuration in which the colored portions constituting the color filters of the liquid crystal panel only include red (R), green (G), and blue (B), which are the three primary colors of light, is included in the present invention.

(21) In the embodiments above, a case was described in which the phosphors used in the LED were a green phosphor that emits green light and a red phosphor that emits red light, but a configuration in which only a yellow phosphor that emits yellow light is used, for example, is included in the present invention. As a yellow phosphor, it is preferable that α-SiAlON, which is a type of SiAlON phosphor, be used, for example. It is also possible to use three types of phosphors including the yellow phosphor in addition to the green phosphor and the red phosphor. It is also possible to use the green phosphor and the yellow phosphor but not the red phosphor. As for the specific substances used for the phosphors of each color, appropriate modifications can be made to use other phosphors besides those mentioned above.

(22) In the embodiments above, a configuration was described in which an LED chip that emits only blue light is combined with a phosphor to form an LED that emits substantially white light, but a configuration in which an LED chip that emits visible purple light or near-ultraviolet light is combined with a phosphor to form an LED that emits substantially white light is also included in the present invention. It is preferable that three phosphors including a blue phosphor that emits blue, a green phosphor that emits green, and a red phosphor that emits red be used, but the color of other phosphors used besides these can be appropriately modified.

(23) In the embodiments above, a configuration was described in which an LED chip that emits only blue light is combined with a phosphor to form an LED that emits substantially white light, but a configuration in which three LED chips that respectively emit only red light, only green light, and only blue light are combined to form one LED is also included in the present invention. The present invention also includes an LED constituted of three types of LED chips that respectively emit only C (cyan), only M (magenta), and only Y (yellow). In such a case, by appropriately controlling the amount of current flowing to the respective LED chips during illumination, the chromaticity of the LED can be adjusted.

(24) In the embodiments above, an example was shown in which the device is placed upright with the shorter side direction of the liquid crystal panel and the chassis corresponding to the vertical direction, but a configuration in which the device is placed upright with the longer side direction of the liquid crystal panel and the chassis corresponding to the vertical direction is also included in the present invention.

(25) In the embodiments above, TFTs are used as the switching element in the liquid crystal display device, but the present invention can be applied to a liquid crystal display device that uses a switching element other than a TFT (a thin film diode (TFD), for example), and, besides a color liquid crystal display device, the present invention can also be applied to a black and white liquid crystal display device.

(26) In the embodiments above, a liquid crystal display device using a liquid crystal panel as a display panel was described as an example, but the present invention can be applied to a display device that uses another type of display panel.

(27) In the respective embodiments above, a television receiver that includes a tuner was illustratively shown, but the present invention is also applicable to a display device without a tuner.

DESCRIPTION OF REFERENCE CHARACTERS 10 liquid crystal display device (display device)
11 liquid crystal panel (display panel)
12 backlight device (illumination device)
24 LED (light source, point light source)
25 LED substrate (light source substrate)
25a1 mounting surface
25c wiring pattern (wiring line member)
27 diffusion lens (optical lens)
29 reflective sheet (reflective member)
29d lens insertion hole (light source insertion hole)
30 first light-reflecting layer
31 second light-reflecting layer
31a dot
TV television receiver

The invention claimed is:
1. An illumination device, comprising:
a light source;
a light source substrate on which the light source is mounted;
a reflective member that reflects light from the light source, and that has a light source insertion hole for inserting the light source, the reflective member covering a mounting surface on the light source substrate for mounting the light source;
a first light-reflecting layer that reflects light from the light source, the first light-reflecting layer being formed at least in the light source insertion hole of the reflective member on the light source substrate; and
a second light-reflecting layer disposed in the light source insertion hole of the reflective member on the light source substrate, the second light-reflecting layer having a light reflectance different from that of the first light-reflecting layer and being disposed so as to cover a portion of the first light-reflecting layer,
wherein the second light-reflecting layer has a light reflectance lower than that of the first light-reflecting layer, and
wherein the second light-reflecting layer is formed such that a proportion of area per unit area taken up by the second light-reflecting layer on the mounting surface of the light source substrate is smaller, the further away the second light-reflecting layer is from the light source.

2. The illumination device according to claim 1, wherein the second light-reflecting layer includes a plurality of dots distributed on the mounting surface of the light source substrate such that the dots have a smaller diameter, the further away from the light source said dots are.

3. The illumination device according to claim 1, wherein the second light-reflecting layer includes a plurality of dots distributed on the mounting surface of the light source substrate such that a gap between adjacent said dots is greater, the further away from the light source said dots are.

4. The illumination device according to claim 1, wherein the light source is a point light source on the mounting surface of the light source substrate, and the second light-reflecting layer surrounds the point light source in a plan view.

5. The illumination device according to claim 1, wherein the second light-reflecting layer is formed such that a light reflectance of the mounting surface of the light source substrate is greater in portions of the mounting surface further from the light source.

6. The illumination device according to claim 1, wherein the second light-reflecting layer includes a plurality of dots distributed on the mounting surface of the light source substrate.

7. The illumination device according to claim 1,
wherein the mounting surface of the light source substrate has formed thereon a wiring line member connected to the light source, and
wherein the first light-reflecting layer is made of a solder resist that covers the wiring line member.

8. An illumination device, comprising:
a light source;
a light source substrate on which the light source is mounted;
a reflective member that reflects light from the light source, and that has a light source insertion hole for inserting the light source, the reflective member covering a mounting surface on the light source substrate for mounting the light source;
a first light-reflecting layer that reflects light from the light source, the first light-reflecting layer being formed at least in the light source insertion hole of the reflective member on the light source substrate; and a second light-reflecting layer disposed in the light source insertion hole of the reflective member on the light source substrate, the second light-reflecting layer having a light reflectance different from that of the first light-reflecting layer and being disposed so as to cover a portion of the first light-reflecting layer, wherein the light source is a point light source on the mounting surface of the light source substrate, and the second light-reflecting layer surrounds the point light source in a plan view, and wherein the second light-reflecting layer includes a plurality of dots distributed in the light source insertion hole on the mounting surface of the light source substrate so as to surround the point light source on a circle with a center corresponding in position to the point light source, said dots adjacent in a circumferential direction having a substantially equal area and gaps therebetween.

9. An illumination device, comprising:
a light source;
a light source substrate on which the light source is mounted;
a reflective member that reflects light from the light source, and that has a light source insertion hole for inserting the light source, the reflective member covering a mounting surface on the light source substrate for mounting the light source;
a first light-reflecting layer that reflects light from the light source, the first light-reflecting layer being formed at least in the light source insertion hole of the reflective member on the light source substrate; and
a second light-reflecting layer disposed in the light source insertion hole of the reflective member on the light source substrate, the second light-reflecting layer having a light reflectance different from that of the first light-reflecting layer and being disposed so as to cover a portion of the first light-reflecting layer, wherein the light source substrate includes an optical lens that is disposed so as to face the light source and that receives light from the light source and outputs said light while applying an optical effect thereon, the light source insertion hole in the reflective member being large enough to insert both the light source and the optical lens, and wherein the second light-reflecting layer is formed at least in an area corresponding in position to the optical lens in a plan view.

10. The illumination device according to claim 9, wherein the second light-reflecting layer is formed over a wider area than the optical lens in a plan view.

11. An illumination device, comprising:
a light source;
a light source substrate on which the light source is mounted;
a reflective member that reflects light from the light source, and that has a light source insertion hole for inserting the light source, the reflective member covering a mounting surface on the light source substrate for mounting the light source;
a first light-reflecting layer that reflects light from the light source, the first light-reflecting layer being formed at least in the light source insertion hole of the reflective member on the light source substrate; and
a second light-reflecting layer disposed in the light source insertion hole of the reflective member on the light source substrate, the second light-reflecting layer having a light reflectance different from that of the first light-reflecting layer and being disposed so as to cover a portion of the first light-reflecting layer, wherein the mounting surface of the light source substrate has formed thereon a wiring line member connected to the light source, wherein the first light-reflecting layer is made of a solder resist that covers the wiring line member, and wherein the solder resist from which the first light-reflecting layer is made is coated as a liquid onto the mounting surface of the light source substrate and then cured.

12. A display device, comprising the illumination device according to claim 1, and a display panel that performs display using light from the illumination device.

13. A television receiver, comprising the display device according to claim 12.

* * * * *